(12) United States Patent
Barber et al.

(10) Patent No.: US 8,168,055 B2
(45) Date of Patent: May 1, 2012

(54) ARRANGEMENT OF ION EXCHANGE MATERIAL WITHIN AN ELECTRODEIONIZATION APPARATUS

(75) Inventors: John H. Barber, Fergus (CA); David Florian Tessier, Waterloo (CA)

(73) Assignee: General Electric Company, Schenectady, NY (US)

( * ) Notice: Subject to any disclaimer, the term of this patent is extended or adjusted under 35 U.S.C. 154(b) by 97 days.

(21) Appl. No.: 12/923,227

(22) Filed: Sep. 10, 2010

(65) Prior Publication Data

US 2011/0000792 A1 Jan. 6, 2011

Related U.S. Application Data

(62) Division of application No. 11/525,211, filed on Sep. 22, 2006, now Pat. No. 8,066,860.

(51) Int. Cl.
*B01D 61/48* (2006.01)
(52) U.S. Cl. .................. 204/632; 204/633; 204/636
(58) Field of Classification Search ............ 204/632, 204/633, 634, 636
See application file for complete search history.

(56) References Cited

U.S. PATENT DOCUMENTS

| | | | |
|---|---|---|---|
| 6,156,180 A * | 12/2000 | Tessier et al. | 204/524 |
| 2003/0150732 A1 | 8/2003 | Yamanaka et al. | |

FOREIGN PATENT DOCUMENTS

| | | |
|---|---|---|
| EP | 1338568 A | 8/2003 |
| WO | WO 97/25147 | 7/1997 |
| WO | WO 00/44477 | 8/2000 |
| WO | WO 2004/024992 | 3/2004 |
| WO | WO 2005/009596 | 2/2005 |

* cited by examiner

*Primary Examiner* — Arun S Phasge
(74) *Attorney, Agent, or Firm* — Arne L. Fors

(57) ABSTRACT

An electrodeionization apparatus is provided comprising an ion-concentrating compartment partially bounded by an anion permeable membrane and also partially bounded by a cation permeable membrane, and a first ion exchange material domain disposed within the ion-concentrating compartment, wherein the first ion exchange material domain is contiguous with at least a portion of an ion-concentrating compartment side surface of one of the anion permeable membrane and the cation permeable membrane, and is spaced apart from the other one of the one of the anion permeable membrane and the cation permeable membrane. In the case where the one of the anion permeable membrane and the cation permeable membrane, having the at least a portion of an ion-concentrating compartment side surface with which the first ion exchange material domain is contiguous, is an anion permeable membrane, the first ion exchange material domain is an anion exchange material predominant domain. In the case where the one of the anion permeable membrane and the cation permeable membrane, having the at least a portion of an ion-concentrating compartment side surface with which the first ion exchange material domain is contiguous, is a cation permeable membrane, the first ion exchange material domain is a cation exchange material predominant domain.

12 Claims, 16 Drawing Sheets

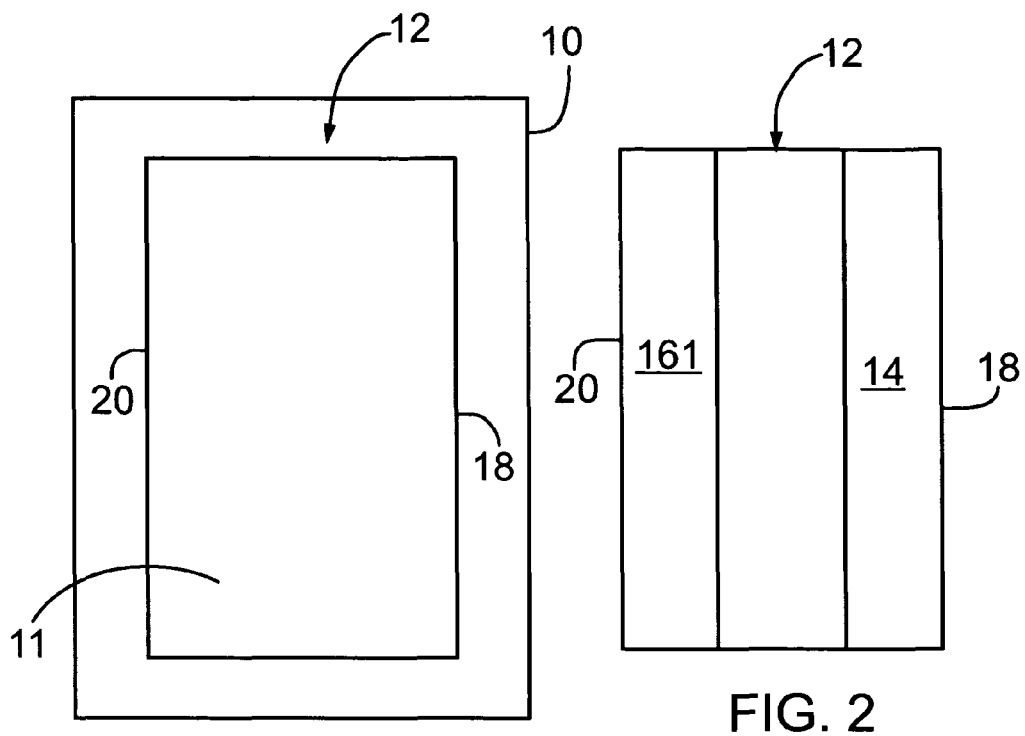
FIG. 1
FIG. 2
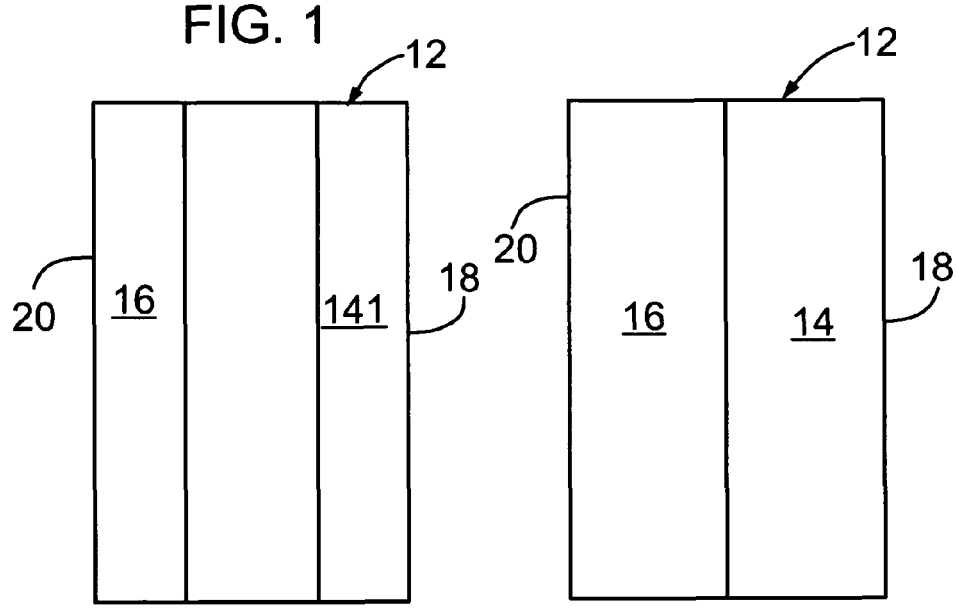
FIG. 3
FIG. 4

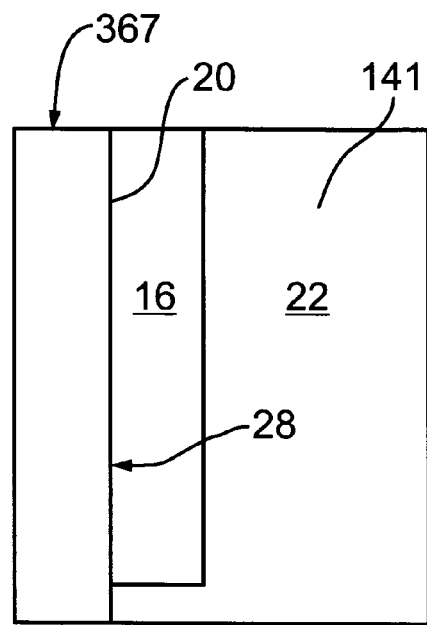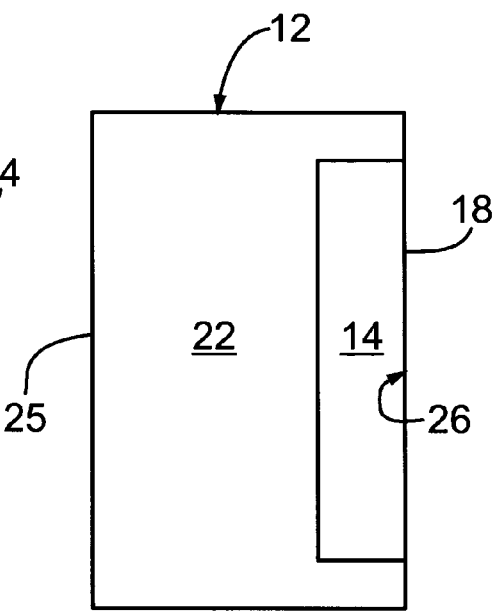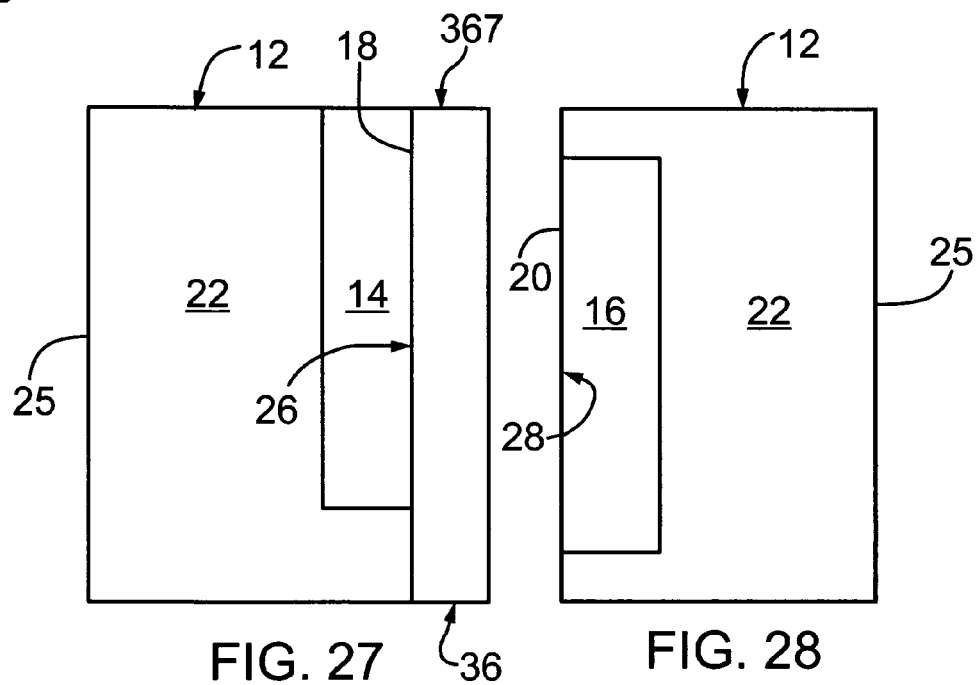
FIG. 25  FIG. 26  FIG. 27  FIG. 28

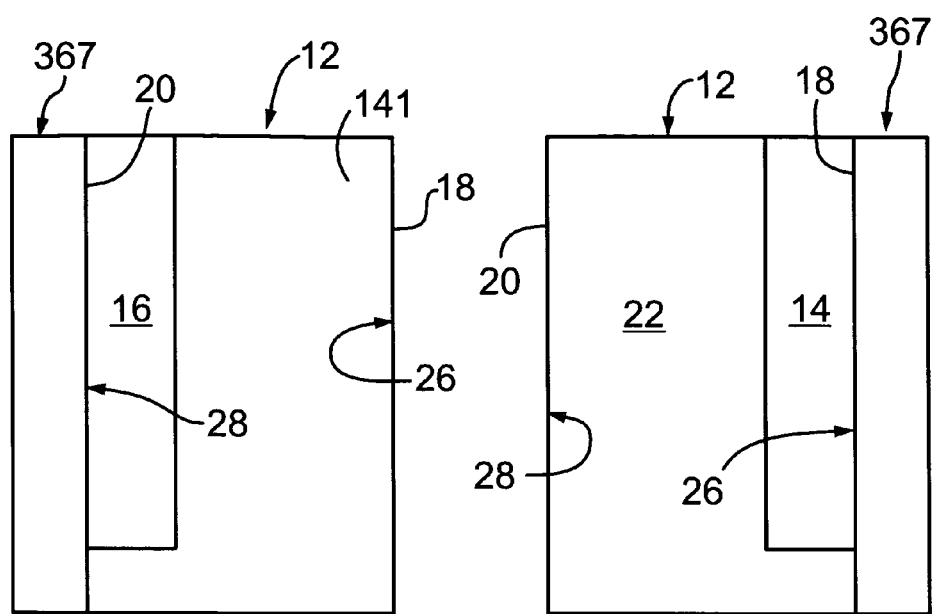
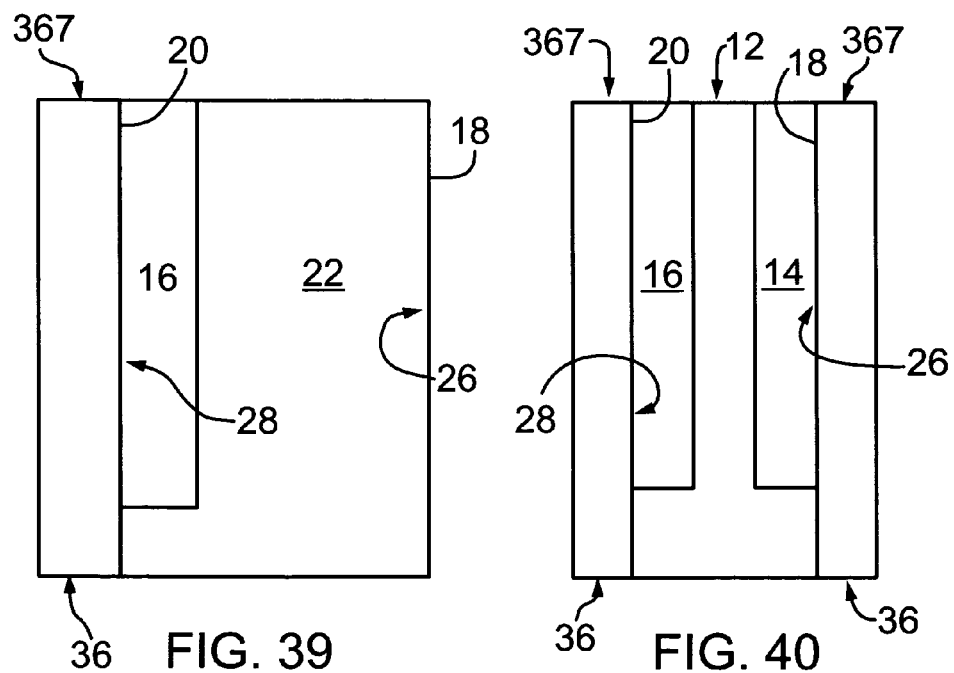

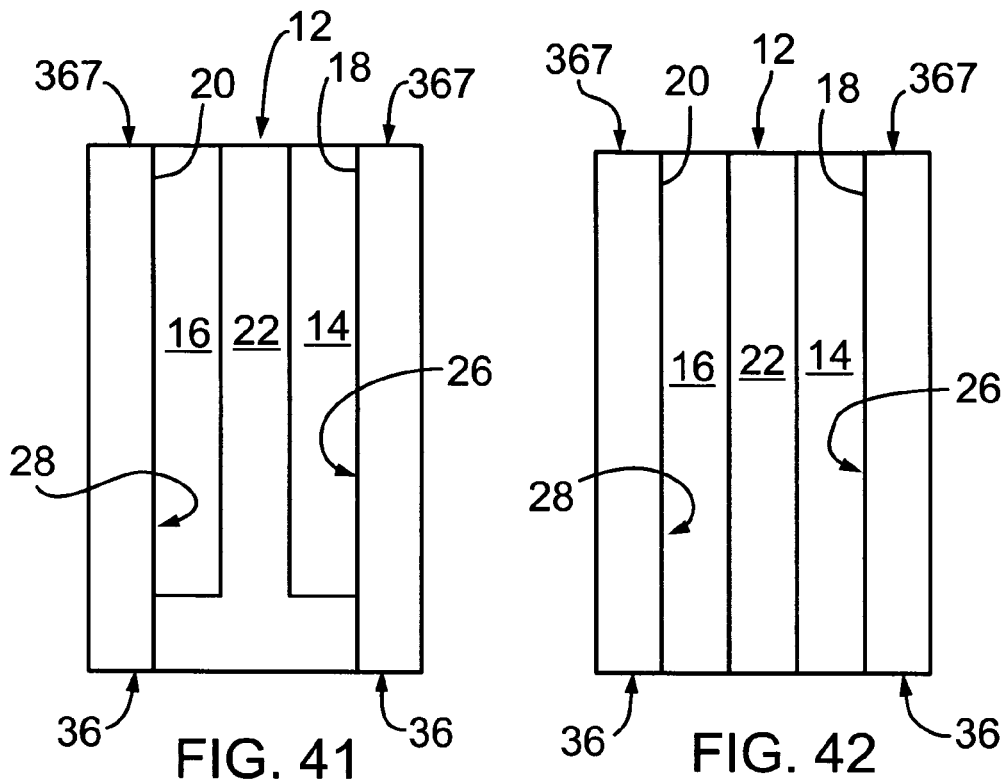
FIG. 41
FIG. 42
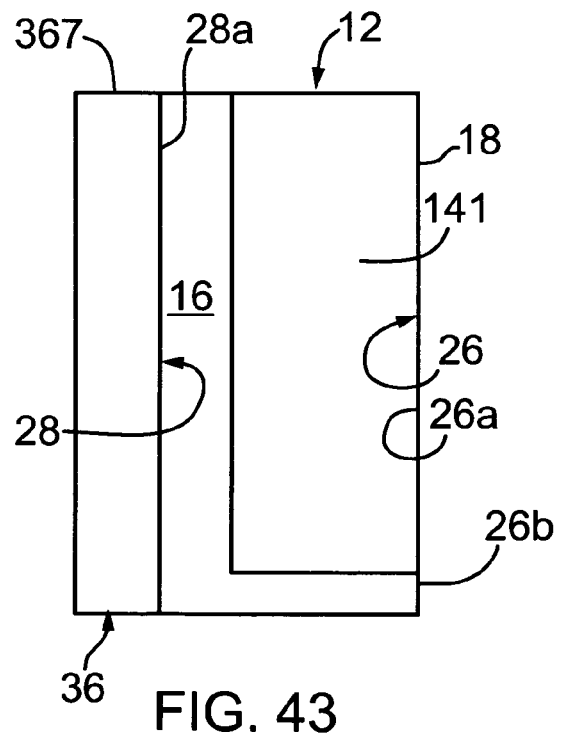
FIG. 43

ARRANGEMENT OF ION EXCHANGE MATERIAL WITHIN AN ELECTRODEIONIZATION APPARATUS

This application is a Divisional of application Ser. No. 11/525,211 filed Sept. 22, 2006, now Patent 8,066,860.

FIELD OF THE INVENTION

The present invention relates to an electrodeionization apparatus and, more particularly, to the arrangement of ion exchange material within the concentrating compartment of an electrodeionization apparatus.

BACKGROUND OF THE INVENTION

Performance of an electrodeionization apparatus depends on the rejection/blockage/encapsulation of impurity ions in the ion-concentrating compartments, that have migrated from the ion-depleting compartments through their respective ion permeable membranes. The ion-concentrating compartments in an electrodeionization apparatus may be filled with either: (a) water, or an aqueous solution, which receives the impurity ions, or (b) water, or an aqueous solution, in conjunction with some ion-conducting materials. When the ion-concentrating compartment spacers are filled with non-ionconductive mesh, the ions from the ion-depleting compartments directly enter the liquid phase of the ion-concentrating compartments at the membrane surface. Solution mixing, ion migration, and ion diffusion take place to provide a homogeneous liquid at a distance from the membrane surfaces. When the ion-concentrating compartments contain ion-conductive materials, the impurities that have migrated out of the ion-depleting compartments will remain in their respective ion-conductive phases until the impurities either: (a) perform ion-exchange with another ion from solution, or (b) are transferred to the liquid phase, by migration, along with a corresponding oppositely charged ion from the oppositely charged ion-exchange material.

For the normal salt ions, such as: $Na^+$, $K^+$, $Li^+$, etc. and $Cl^-$, $Br^-$, $NO_3^-$, $SO_4^{2-}$, etc., migrating into the ion-concentrating compartments, their concentration merely increases in the liquid flowing through the ion-concentrating compartments.

For acidic and basic ions, the transition of these ions into solution from the ion exchange material phase can cause an acid/base reaction to occur, forming a neutral compound. For example, the following reactions may occur:

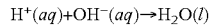

 (acetic acid formation)

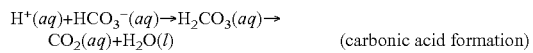 (carbonic acid formation)

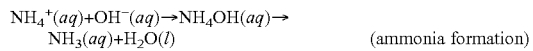 (ammonia formation)

In cases where the positive and negative ions entering the solution phase form a compound with low solubility, high local concentration levels can be developed, leading to the formation of a precipitate. For example, the following mechanisms may be operative:

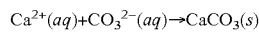

and

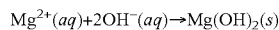

Controlling the location where these scaling reactions occur is vital to both the ability of an electrodeionization apparatus to produce high resistivity product water and to reduce scale formation in the ion-concentrating compartments. The effect of the configuration of the ion exchange material in the ion-concentrating compartment on the product water resistivity arises from the fact that neutral species formed in the ion-concentrating compartments from acid/base neutralization reactions are not rejected by one of the two ion-permeable membranes. The formed neutral species, such as $CO_2$, $CH_3COOH$ and other weak acids, can diffuse through a low pH cation permeable membrane, but if they come into contact with a high pH anion permeable membrane, they are ionized and rejected. Similarly, weak bases such as $NH_3$ are not rejected by the anion permeable membranes and are able to diffuse through the anion permeable membranes, but become ionized when in contact with a low pH cation permeable membrane. The rate at which this back diffusion (e.g. $CO_2$ or $CH_3COOH$ through a cation permeable membrane, or $NH_3$ through an anion permeable membrane) occurs is dependent on the local concentration of the species in the ion-concentrating compartment and its location with respect to the membrane surface, and also the intrinsic membrane properties.

In an electrodeionization apparatus containing inert mesh filled ion-concentrating compartment spacers, the concentrations of these neutral weak acid and weak base species do not build up at the membrane surfaces and their back diffusion into the ion-depleting compartments is minimal. However, this is not the case in an electrodeionization apparatus with ion-exchange material filled ion-concentrating compartments. With ion exchange material structures of pure anion, pure cation or mixed bed ion exchange resins, weak acid and base impurity species can travel within an ion exchange material phase all the way through the thickness of the ion-concentrating compartment to the surface of the opposing ion permeable membrane. At this interface, the ion can encounter either a hydronuim ion (cation permeable membrane surface) or a hydroxide ion (anion permeable membrane surface) and form a neutral molecule. Due to the low linear velocity at the membrane surface, a high concentration of these neutral species can form, creating a large driving force for the back diffusion of these species into the adjacent ion-depleting compartments. Once these species are transported into the ion-depleting compartments through this back diffusion, ionization occurs which reduces the product water resistivity.

SUMMARY OF THE INVENTION

There is provided an electrodeionization apparatus including an ion-concentrating compartment having a unique configuration of ion exchange material.

In one aspect, there is provided an electrodeionization apparatus comprising an ion-concentrating compartment partially bounded by an anion permeable membrane and also partially bounded by a cation permeable membrane, and an ion exchange material domain disposed within the ion-concentrating compartment, wherein the ion exchange material domain is contiguous with at least a portion of an ion-concentrating compartment side surface of one of the anion permeable membrane and the cation permeable membrane, and is spaced apart from the other one of the one of the anion permeable membrane and the cation permeable membrane. The at least a portion of the ion-concentrating compartment side surface of the one of the anion permeable membrane and the cation permeable membrane defines an operative side surface fraction of the ion-concentrating compartment side surface of the one of the anion permeable membrane and the cation permeable membrane. In the case where the one of the anion permeable membrane and the cation permeable membrane, having the at least a portion of an ion-concentrating compartment side surface with which the ion exchange material domain is contiguous, is an anion permeable membrane, the ion exchange material domain is an anion exchange material predominant domain. In the case where the one of the anion permeable membrane and the cation permeable membrane, having the at least a portion of an ion-concentrating compartment side surface with which the ion exchange material domain is contiguous, is a cation permeable membrane, the ion exchange material domain is a cation exchange material predominant domain.

In another aspect, there is provided an electrodeionization apparatus comprising an ion-concentrating compartment partially bounded by a first ion permeable membrane and also partially bounded by a separator element, wherein the first ion permeable membrane is one of an anion permeable membrane and a cation permeable membrane, a first ion exchange material domain disposed within the ion-concentrating compartment, wherein the first ion exchange material domain is contiguous with at least a portion of an ion-concentrating compartment side surface of the first ion permeable membrane, and wherein the at least a portion of the ion-concentrating compartment side surface of the first ion permeable membrane defines an operative side surface fraction of the ion-concentrating compartment side surface of the first ion permeable membrane, and a second ion exchange material domain disposed within the ion-concentrating compartment, wherein the disposition of the first ion exchange material domain relative to the separator element defines a first space between the first ion exchange material domain and the separator element, and wherein at least a portion of the second ion exchange material domain is disposed within the first space. Where the first ion permeable membrane, having the at least a portion of the ion-concentrating compartment side surface with which the first ion exchange material domain is contiguous, is an anion permeable membrane, the first ion exchange material domain is an anion exchange material predominant domain and the second ion exchange material domain is a non-anion exchange material predominant domain. Where the first ion permeable membrane, having the at least a portion of the ion-concentrating compartment side surface with which the first ion exchange material domain is contiguous, is a cation permeable membrane, the first ion exchange material domain is a cation exchange material predominant domain and the second ion exchange material domain is a non-cation exchange material predominant domain.

In a further aspect, there is provided an electrodeionization apparatus comprising an ion-concentrating compartment partially bounded by an anion permeable membrane and also partially bounded by a cation permeable membrane, wherein the anion permeable membrane includes an ion-concentrating compartment side surface which defines an ion-concentrating compartment side surface area of the anion permeable membrane, and wherein the cation permeable membrane includes an ion-concentrating compartment side surface which defines an ion-concentrating compartment side surface area of the cation permeable membrane, and a first ion exchange material domain within the ion-concentrating compartment, wherein the first ion exchange material domain is contiguous with at least a portion of the ion-concentrating compartment side surface of one of the anion permeable membrane and the cation permeable membrane, wherein the at least a portion of the ion-concentrating compartment side surface of the one of the anion permeable membrane and the cation permeable membrane defines an operative side surface fraction of the ion-concentrating compartment side surface of the one of the anion permeable membrane and the cation permeable membrane, and wherein the operative side surface fraction of the ion-concentrating compartment side surface of the one of the anion permeable membrane and the cation permeable membrane defines an operative side surface area fraction of the ion-concentrating compartment side surface of the one of the anion permeable membrane and the cation permeable membrane which is at least 10% of the ion-concentrating compartment side surface area of the one of the anion permeable membrane and the cation permeable membrane, and wherein the operative side surface fraction of the ion-concentrating compartment side surface of the one of the anion permeable membrane and the cation permeable membrane, in comparison to substantially any remaining fractions of the ion-concentrating compartment side surface of the one of the anion permeable membrane and the cation permeable membrane, is closest to an outlet of an ion-depleting compartment disposed on an opposite side of the one of the anion permeable membrane and the cation permeable membrane, and wherein the first ion exchange material domain is spaced apart from at least a portion of the ion-concentrating compartment side surface of the other one of the one of the anion permeable membrane and the cation permeable membrane, and wherein the at least a portion of the ion-concentrating compartment side surface of the other one of the one of the anion permeable membrane and the cation permeable membrane defines an operative side surface fraction of the other one of the one of the anion permeable membrane and the cation permeable membrane, and wherein the operative side surface fraction of the ion-concentrating compartment side surface of the other one of the one of the anion permeable membrane and the cation permeable membrane defines an operative side surface area fraction of the ion-concentrating compartment side surface of the other one of the one of the anion permeable membrane and the cation permeable membrane which is at least 10% of the ion-concentrating compartment side surface area of the other one of the one of the anion permeable membrane and the cation permeable membrane, and wherein the operative side surface fraction of the ion-concentrating compartment side surface of the other one of the one of the anion permeable membrane and the cation permeable membrane, in comparison to substantially any remaining portions of the ion-concentrating compartment side surface of the other one of the one of the anion permeable membrane and the cation permeable membrane, is closest to an outlet of an ion-depleting compartment disposed on an opposite side of the other one of the one of the anion permeable membrane and the cation permeable membrane. In the case where the one of the anion permeable membrane and the cation permeable membrane, having the at least a portion of the ion-concentrating compartment side surface with which the first ion exchange material domain is contiguous, is the anion permeable membrane, the first ion exchange material domain is an anion exchange material predominant domain, and wherein the anion exchange material predominant domain is contiguous with at least a portion of the ion-concentrating compartment side surface of the anion permeable membrane, and wherein the at least a portion of the ion-concentrating compartment side surface of the anion permeable membrane defines a first operative side surface fraction of the ion-concentrating compartment side surface of the anion permeable membrane, and wherein the first operative side surface fraction of the ion-concentrating compartment side surface of the anion permeable membrane defines a first operative side surface area fraction of the ion-concentrating compartment side surface of the anion permeable membrane which is at least 10% of the ion-concentrating compartment side surface area of the anion permeable membrane, and wherein the first operative side surface fraction of the ion-concentrating compartment side surface of the anion permeable membrane, in comparison to substantially any remaining fractions of the ion-concentrating compartment side surface of the anion permeable membrane, is closest to an outlet of an ion-depleting compartment disposed on an opposite side of the anion permeable membrane, and wherein the anion exchange material predominant domain is spaced apart from at least a portion of the ion-concentrating compartment side surface of the cation permeable membrane, and wherein the at least a portion of the ion-concentrating compartment side surface of the cation permeable membrane defines a first operative side surface fraction of the ion-concentrating compartment side surface of the cation permeable membrane, and wherein the first operative side surface fraction of the ion-concentrating compartment side surface of the cation permeable membrane defines a first operative side surface area fraction of the ion-concentrating compartment side surface of the cation permeable membrane which is at least 10% of the ion-concentrating compartment side surface area of the cation permeable membrane, and wherein the first operative side surface fraction of the ion-concentrating compartment side surface of the cation permeable membrane, in comparison to substantially any remaining fractions of the ion-concentrating compartment side surface of the cation permeable membrane, is closest to an outlet of an ion-depleting compartment disposed on an opposite side of the cation permeable membrane. In the case where the one of the anion permeable membrane and the cation permeable membrane, having the at least a portion of the ion-concentrating compartment side surface with which the first ion exchange material domain is contiguous, is the cation permeable membrane, the first ion exchange material domain is a cation exchange material predominant domain, and wherein the cation exchange material predominant domain is contiguous with at least a portion of the ion-concentrating compartment side surface of the cation permeable membrane, and wherein the at least a portion of the ion-concentrating compartment side surface of the cation permeable membrane defines a second operative side surface fraction of the ion-concentrating compartment side surface of the cation permeable membrane, and wherein the second operative side surface fraction of the ion-concentrating compartment side surface of the cation permeable membrane defines a second operative side surface area fraction of the ion-concentrating compartment side surface of the cation permeable membrane which is at least 10% of the ion-concentrating compartment side surface area of the cation permeable membrane, and wherein the second operative side surface fraction of the ion-concentrating compartment side surface of the cation permeable membrane, in comparison to substantially any remaining fractions of the ion-concentrating compartment side surface of the cation permeable membrane, is closest to an outlet of an ion-depleting compartment disposed on an opposite side of the cation permeable membrane, and wherein the cation exchange material predominant domain is spaced apart from at least a portion of the ion-concentrating compartment side surface of the anion permeable membrane, and wherein the at least a portion of the ion-concentrating compartment side surface of the anion permeable membrane defines a second operative side surface fraction of the ion-concentrating compartment side surface of the anion permeable membrane, and wherein the second operative side surface fraction of the ion-concentrating compartment side surface of the anion permeable membrane defines a second operative side surface area fraction of the ion-concentrating compartment side surface of the anion permeable membrane which is at least 10% of the ion-concentrating compartment side surface area of the anion permeable membrane, and wherein the second operative side surface fraction of the ion-concentrating compartment side surface of the anion permeable membrane, in comparison to substantially any remaining fractions of the ion-concentrating compartment side surface of the anion permeable membrane, is closest to an outlet of an ion-depleting compartment disposed on an opposite side of the anion permeable membrane.

BRIEF DESCRIPTION OF DRAWINGS

The method and apparatus of the preferred embodiments of the invention will now be described with the following accompanying drawings:

FIG. 1 is schematic illustration of an electrodeionization apparatus;

FIGS. 2 to 13 are schematic illustrations of an embodiment of an ion-concentrating compartment of an electrodeionization apparatus;

FIGS. 14 to 35 are schematic illustrations of another embodiment of an ion-concentrating compartment of an electrodeionization apparatus;

FIGS. 36 to 43 are schematic illustrations of a further embodiment of an ion-concentrating compartment of an electrodeionization apparatus;

DETAILED DESCRIPTION OF PREFERRED EMBODIMENTS OF THE INVENTION (a) Electrodeionization Apparatus Referring to FIG. 1, there is provided an electrodeionization apparatus 10 including at least one ion-concentrating compartment 12 having ion exchange material disposed therein.

Figure 44:
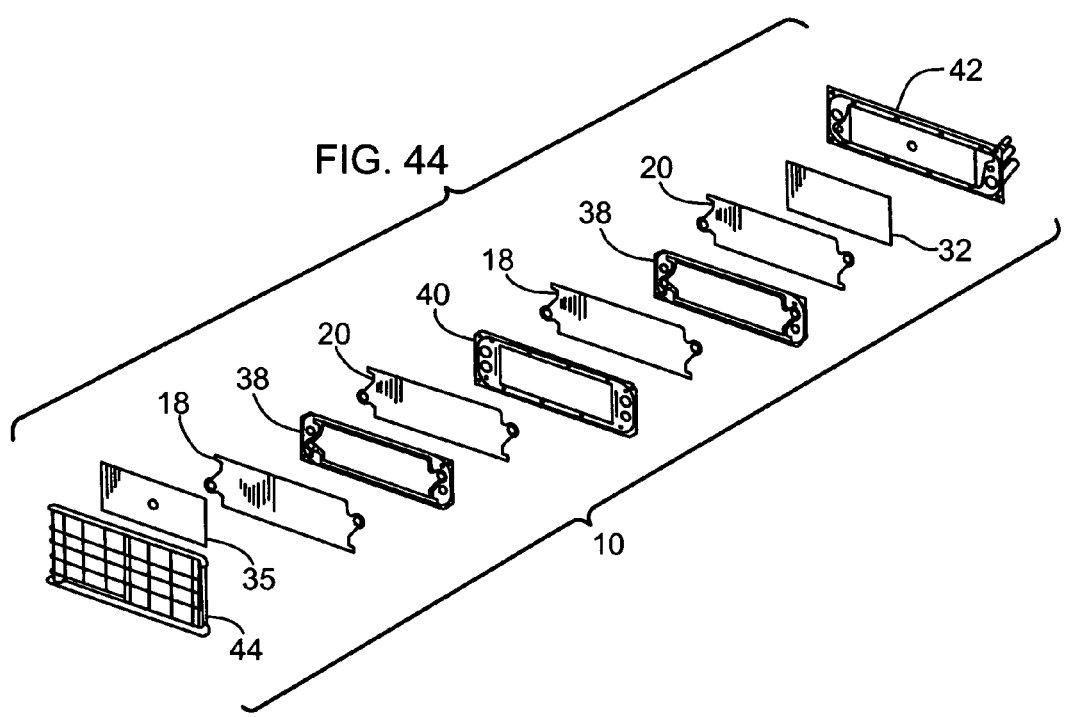
FIG. 44 is an exploded view of components of an electrodeionization apparatus.
Figure 45:
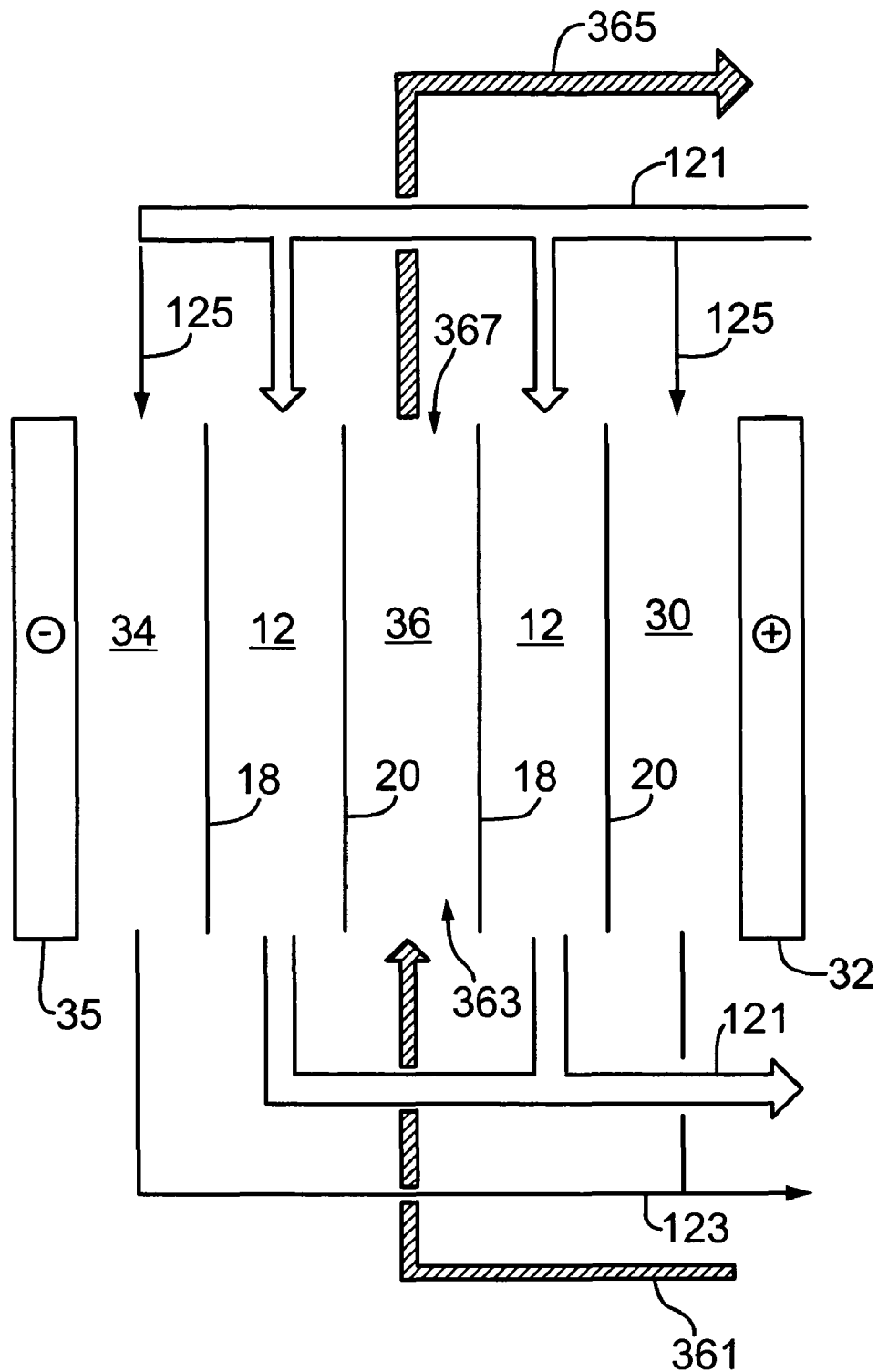
FIG. 45 is a schematic illustration of an electrodeionization process.

With respect to the electrodeionization apparatus 10, for example, and referring to FIGS. 44 and 45 the electrodeionization apparatus 10 includes an anode compartment 30 provided with an anode 32, and a cathode compartment 34 provided with a cathode 35. Each of the compartments 30, 34 is configured to receive a flow of electrolytic material 125, such as water or an aqueous solution. The anode 32 and cathode 35 are configured for coupling to a DC power source to effect an electric potential difference between the anode 32 and the cathode 35 and thereby influence transport of ionic material in liquid media and ion exchange media by the influence of the electric potential difference.

A plurality of anion permeable membranes 18 and cation permeable membranes 20 are alternately arranged between the anode compartment 30 and the cathode compartment 34 to form alternating ion-depleting compartments 36 and ion-concentrating compartments 12. Each of the ion-depleting compartments 36 is bounded by an anion permeable membrane 18 on the anode side and by a cation permeable membrane 20 on the cathode side. Each of the ion-concentrating compartments 12 is bounded by a cation permeable membrane 20 on the anode side and by an anion permeable membrane 18 on the cathode side. The anion permeable membrane 18 is configured to permit preferential transport of anions into the ion-concentrating compartment 12. The cation permeable membrane 20 is configured to permit preferential transport of cations into the ion concentrating compartment 12. The ion-depleting compartment 36 is configured to receive a flow 361 of liquid to be treated, such as an aqueous solution, through an inlet 363. The liquid flow 361 is purified in the compartment 36 and is discharged as a purified liquid flow 365 through the outlet 367. The ion-concentrating compartment 12 is configured to receive a flow 121 of liquid, such as water or an aqueous solution, which accepts the ions that transport from adjacent ion-depleting compartments 36, out of the ion-concentrating compartment 12. A liquid flow 123, which is concentrated in these ions, is discharged from the compartment 12. The liquid flowing through the compartment 36 can flow in a co-current or counter-current or cross-current direction, or other possible flow configurations, relative to the liquid flowing through compartment 12. As illustrated in FIG. 45, the electrolyte flow 125 can be supplied from the liquid flow 121. Alternatively, the electrolyte flow 125 can be supplied from liquid flow 361 or liquid flow 365 or other suitable sources.

Exemplary dimensions of (i) ion depleting compartments 36 and (ii) ion concentrating compartments of an electrodeionization apparatus, wherein each of the compartments has the shape of a substantially rectangular parallelepiped defined on two opposing sides by, respectively, a cation permeable membrane 20 and an anion permeable membrane 18, are, respectively, as follows: (i) 13 cm×39 cm×0.8 cm, and (ii) 13 cm×39 cm×0.3 cm, wherein the first dimension is the width of the compartment, the second dimension is the length of the compartment, and the third dimension is the thickness of the compartment which is, more specifically, the distance between the membranes 18 and 20. Exemplary dimensions of electrode compartments 30, 34 of an electrodeionization apparatus, wherein each of the compartments has a shape of a substantially rectangular parallelepiped defined on two opposite by, respectively, an ion permeable membrane (in the case of an anode compartment 30, an anion permeable membrane 18, and in the case of a cathode compartment 34, a cation permeable membrane 20) and an electrode, are as follows: 13 cm×39 cm×0.5 cm, wherein the first dimension is the width of the compartment, the second dimension is the length of the compartment, and the third dimension is the thickness of the compartment which is, more specifically, the distance between the ion permeable membrane and the electrode.

As used herein, the term "anion permeable membrane" means a membrane which is configured to preferentially permit the transport of anions over that of cations from the ion-depleting compartment 36 to the ion-concentrating compartment 12 during operation of the electrodeionization apparatus 10, and is characterized with a water permeability of less than about $6\times10^{-7}$ L/min/cm/psi.

As used herein, the term "cation permeable membrane" means a membrane which is configured to preferentially permit the transport of cations over that of anions from the ion-depleting compartment 36 to the ion-concentrating compartment 12 during operation of the electrodeionization apparatus 10, and is characterized by a water permeability of less than about $6\times10^{-7}$ L/min/cm/psi.

Example of suitable ion permeable membranes include heterogeneous ion exchange membranes and homogeneous ion permeable membranes. Suitable heterogeneous ion permeable membranes include, for example, Membranes International CMI-7000S™ (a cation permeable membrane) and Membranes International AMI-7001S™ (an anion permeable membrane). Suitable homogeneous ion permeable membrane include, for example, GE Infrastructure Water and Process Technologies (formerly IONICS) CR67HMP™ (a cation permeable membrane) and GE Infrastructure Water and Process Technologies (formerly IONICS) A103QDP™ (an anion permeable membrane).

As the anode compartment 30 and/or the cathode compartment 34 may, in some embodiments, be disposed adjacent to an ion-depleting compartment 36 (it is understood that one or both of the compartments 30, 34 can, in some examples, be disposed adjacent to ion-concentrating compartments 12), the compartments 30 and 34 may also be considered to be ion-concentrating compartments. In these circumstances, the compartment 30 or 34 is in communication with the ion-depleting compartment 36 through an ion permeable membrane 18 or 20 and thereby configured to receive ionic material from the ion-depleting compartment 36, such that the compartments 30 and 34 may also be considered to be ion-concentrating compartments 12. This would be the case for an anode compartment 30, where the anode compartment is adjacent to an ion-depleting compartment 36 and separated from the ion-depleting compartment 36 by an anion permeable membrane 18. Similarly, this would also be the case for a cathode compartment 34, where the cathode compartment 34 is adjacent to an ion-depleting compartment 36 and separated from the ion depleting compartment 36 by a cation permeable membrane 20. Compartments 30, 34 may contain ion exchange material, or may contain inert material such as a plastic mesh for spacing the respective membrane from the respective electrode to allow the electrolyte to flow through the respective compartment.

Ion exchange material is disposed within each of the ion-depleting compartments 36. For example, the ion exchange material is mixed ion exchange material. As a further example, the ion depleting compartments 36 are filled with alternating domains of cation exchange material and anion exchange material. Further suitable configurations of ion exchange material for disposition within the ion depleting compartments 36 are described in U.S. Pat. No. 6,197,174.

Examples of suitable forms of ion exchange materials include beads, irregular shaped particles, fibres, rods, fabrics, or porous monoliths. The ion exchange materials may include both natural and synthetic materials. When disposed in either of an ion-concentrating compartment or an ion-depleting compartment, the ion exchange materials may be compacted, as described in U.S. Pat. No. 6,197,174, beginning at column 5, line 61 (see also U.S. Pat. No. 5,961,805 and U.S. Pat. No. 6,228,240).

As used herein, the term "anion exchange material" means material which is preferentially conductive to anionic species. In this respect, such material is configured to selectively exchange anionic species present in the material for anionic species from surrounding liquid and facilitate migration of the exchanged anionic species under an applied electric field.

As used herein, the term "cation exchange material" means material which is preferentially conductive to cationic species. In this respect, such material is configured to selectively exchange cationic species present in the material for cationic species from surrounding liquid and facilitate migration of the exchanged cationic species under an applied electric field.

Examples of suitable anion exchange material include synthetic poly-styrenic beads cross-linked with divinyl benzene, such beads being functionalized with trimethylammonium or dimethylethanolammonium groups (e.g. Mitsubishi DIAION SA10A™ or Mitsbhishi DIAION SA20A™).

Examples of suitable cation exchange material include synthetic poly-styrenic beads cross-linked with divinyl benzene, such beads being functionalized with sulphonic acid groups (e.g. Mitsubishi DIAION SK-1B™).

As used herein, the term "anion exchange material predominant domain 14" is a space within the ion-concentrating compartment 12 comprising ion exchange material, and includes the following characteristics: (i) the domain 14 includes anion exchange materials and may also include cation exchange materials, and if the domain 14 also includes cation exchange materials, the volumetric ratio of anion exchange materials to cation exchange materials within the domain 14 is defined by $\gamma$, wherein $\gamma$ of the domain 14 is greater than or equal to about 4:1, and in the case where the domain 14 is contiguous with a different ion exchange material domain (such as any of domains 16, 22, 141 or 161—see below), the $\gamma$ of domain 14 is greater than or equal to double of the value of the $\gamma$ of the different ion exchange domain with which the domain 14 is contiguous, i.e. (the $\gamma$ of the domain 14)$\geq$2×(the $\gamma$ of the different ion exchange material domain with which the domain 14 is contiguous)

Figure 46:
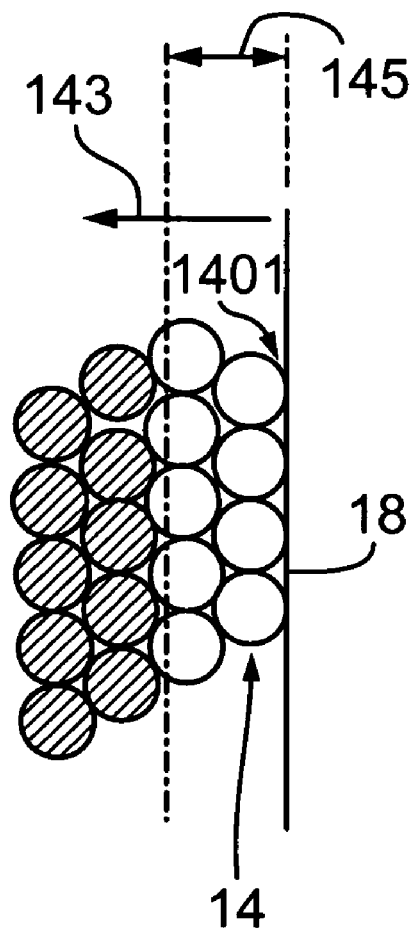
FIG. 46 to 51 are schematic illustrations, depicting measurements of a thickness of an ion exchange domain in an ion-concentrating compartment.

(ii) the domain 14 comprises at least about 20 volume % anion exchange material based on the total volume of the domain 14, (iii) the domain 14 has a minimum thickness 145 of at least about 0.2 millimeters, and where the domain 14 is contiguous with the anion exchange membrane 18, the thickness 145 is measured from a point 1401 on the surface of the anion permeable membrane 18 and in a direction parallel to an axis 143 normal to the anion permeable membrane 18 (see FIG. 46), and (iv) the domain 14 is sufficiently porous so as to be effective in permitting flow of liquid therethrough, and, to this end, is characterized by a water permeability (or, the inverse of "specific pressure loss" of the domain) of between about $6\times10^{-7}$ L/min/cm/psi and about 1.5 L/min/cm/psi. For example, the domain 14 has a thickness equivalent to the thickness of at least one particle diameter, and the thickness of one particle diameter is at least about 0.2 millimeters. For example, the domain 14 comprises at least about 30 volume % anion exchange material based on the total volume of the domain 14. As a further example, the domain 14 comprises at least about 50 volume % anion exchange material based on the total volume of the domain 14.

Figure 50:
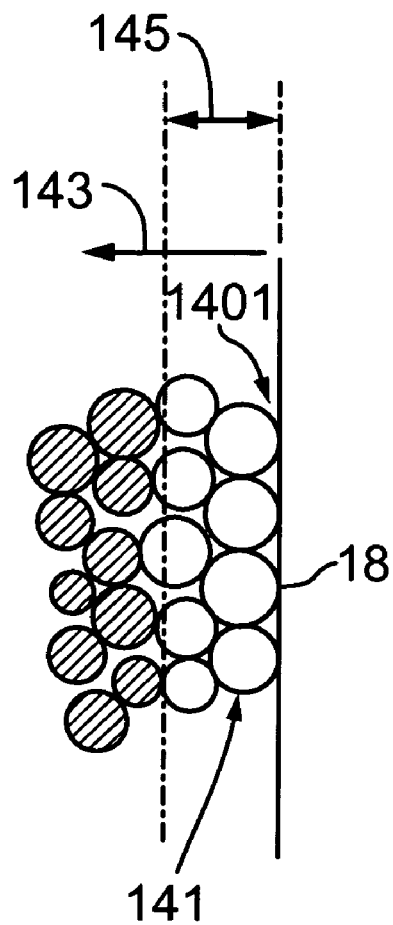

As used herein, the term "non-cation exchange material predominant domain 141" is a space within the ion-concentrating compartment 12, comprising ion exchange material, and includes the following characteristics: (i) the domain 141 includes anion exchange materials and may also include cation exchange materials, and if the domain 14 also includes cation exchange materials, the volumetric ratio of anion exchange materials to cation exchange materials within the domain 141 is defined by $\gamma$, wherein the $\gamma$ of the domain 141 is greater than or equal to about 1:4, (ii) the domain 141 comprises at least about 10 volume % anion exchange material based on the total volume of the domain 141, (iii) the domain 141 has a minimum thickness 145 of at least about 0.2 millimeters, and where the domain 141 is contiguous with the anion exchange membrane 18, the thickness 145 is measured from a point 1401 on the surface of the anion permeable membrane 18 and in a direction parallel to an axis 143 normal to the anion permeable membrane 18 (see FIG. 50), and (iv) the domain 141 is sufficiently porous so as to be effective in permitting flow of liquid therethrough, and, to this end, is characterized by a water permeability (or, the inverse of "specific pressure loss" of the domain) of between about $6\times10^{-7}$ L/min/cm/psi and about 1.5 L/min/cm/psi. For example, the domain 141 has a thickness equivalent to the thickness of at least one particle diameter, and the thickness of one particle diameter is at least about 0.2 millimeters. Examples of suitable cation exchange material include synthetic poly-styrenic beads cross-linked with divinyl benzene, such beads being functionalized with sulphonic acid groups (e.g. Mitsubishi DIAION SK-1B™). For example, $\gamma$ of the domain 141 is at least about 1:1.

As used herein, the term "cation exchange material predominant domain 16" is a space within the ion-concentrating compartment 12 comprising ion exchange material, and includes the following characteristics: (i) the domain 16 includes cation exchange materials and may also include anion exchange materials, and if the domain 16 also includes anion exchange materials, the volumetric ratio of anion exchange materials to cation exchange materials within the domain 16 is defined by $\gamma$, wherein the $\gamma$ of domain 16 is less than or equal to about 1:4, and in the case where the domain 16 is contiguous with a different ion exchange material domain (such as any of domains 14, 22, 141, or 161), the $\gamma$ of domain 16 is less than or equal to ½ (i.e. one-half) of the value of the $\gamma$ of the different ion exchange material domain with which the domain 16 is contiguous, i.e. (the $\gamma$ of the domain 16)$\leq$0.5×(the $\gamma$ of the different ion exchange material domain with which the domain 16 is contiguous)

Figure 47:
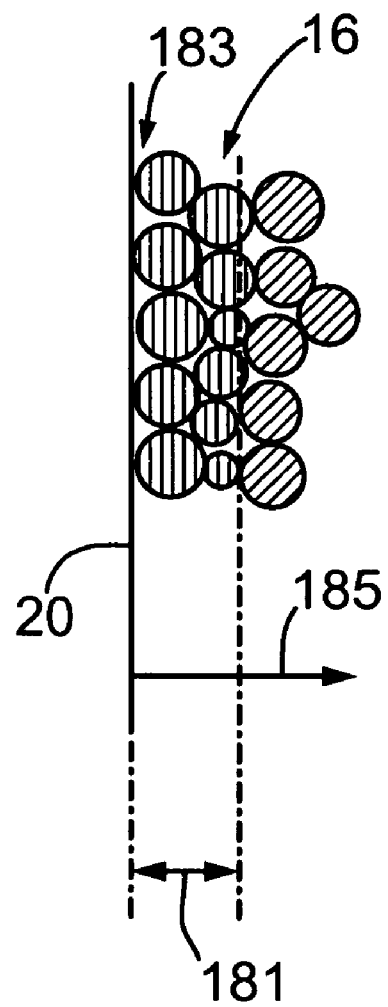

(ii) the domain 16 comprises at least about 20 volume % cation exchange material based on the total volume of the domain 16, (iii) the domain 16 has a minimum thickness 181 of at least about 0.2 millimeters, and where the domain 16 is contiguous with the cation exchange material 20, thickness is measured from a point 183 on the surface of the cation permeable membrane 20 and in a direction parallel to an axis 185 normal to the cation permeable membrane 20 (see FIG. 47), and (iv) the domain 16 is sufficiently porous so as to be effective in permitting flow of liquid therethrough, and, to this end, is characterized by a water permeability (or, the inverse of "specific pressure loss" of the domain) of between about $6\times10^{-7}$ L/min/cm/psi and about 1.5 L/min/cm/psi. For example, the domain 16 has a thickness equivalent to the thickness of at least one particle diameter, and the thickness of one particle diameter is at least about 0.2 millimeters. For example, the domain 16 comprises at least about 30 volume % cation exchange material based on the total volume of the domain 16. As a further example, the domain 16 comprises at least about 50 volume % cation exchange material based on the total volume of the domain 16.

Figure 51:
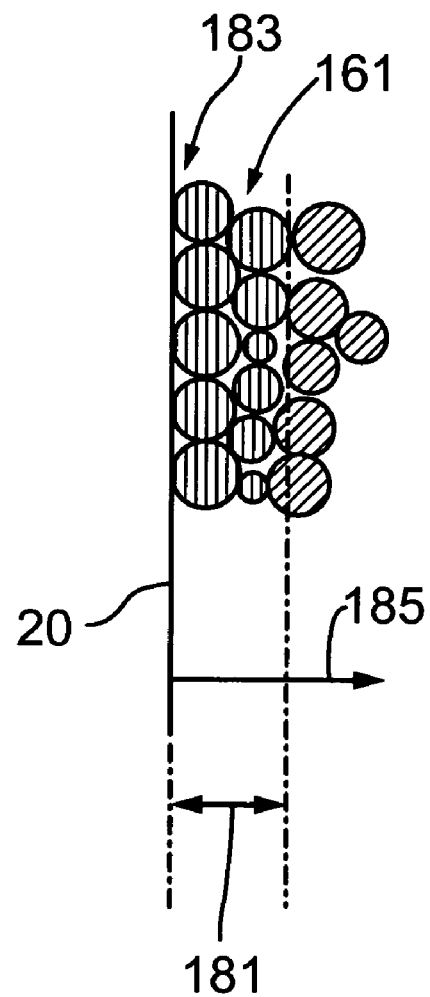

As used herein, the term "non-anion exchange material predominant domain 161" means a space within the ion-concentrating compartment 12, comprising ion exchange material, and includes the following characteristics: (i) the domain 161 includes cation exchange materials and may also include anion exchange materials, and if the domain 161 also includes anion exchange materials, the volumetric ratio of anion exchange materials to cation exchange materials within the domain 161 is defined by $\gamma$, wherein the $\gamma$ of the domain 161 is less than or equal to about 4:1, (ii) the domain 161 comprises at least about 10 volume % cation exchange material based on the total volume of the domain 161, (iii) the domain 161 has a minimum thickness 181 of at least about 0.2 millimeters, and where the domain 161 is contiguous with the cation exchange material 20, thickness is measured from a point 183 on the surface of the cation permeable membrane 20 and in a direction parallel to an axis 185 normal to the cation permeable membrane 20 (see FIG. 51), and (iv) the domain 161 is sufficiently porous so as to be effective in permitting flow of liquid therethrough, and, to this end, is characterized by a water permeability (or, the inverse of "specific pressure loss" of the domain) of between about $6\times10^{-7}$ L/min/cm/psi and about 1.5 L/min/cm/psi. For example, the domain 161 has a thickness equivalent to the thickness of at least one particle diameter, and the thickness of one particle diameter is at least about 0.2 millimeters. For example, the volumetric ratio of cation exchange materials to anion exchange materials within (or, "the γ of") the domain 161 is at least about 1:1.

Figure 48:
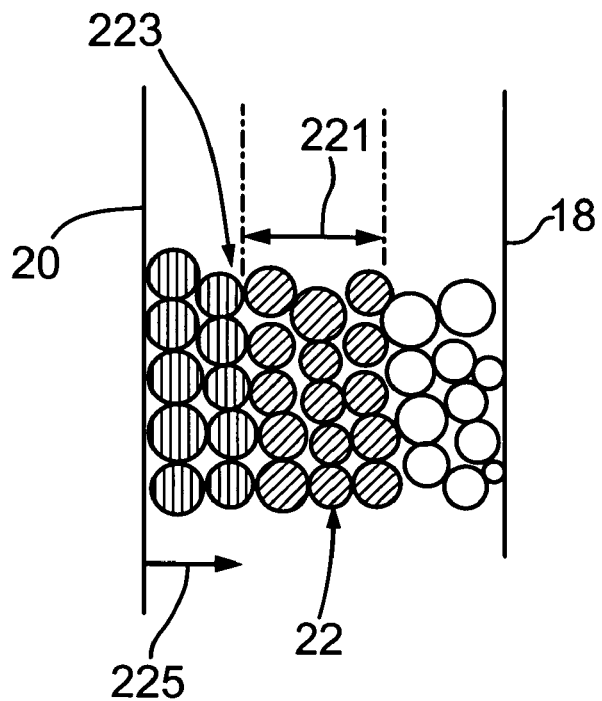
Figure 49:
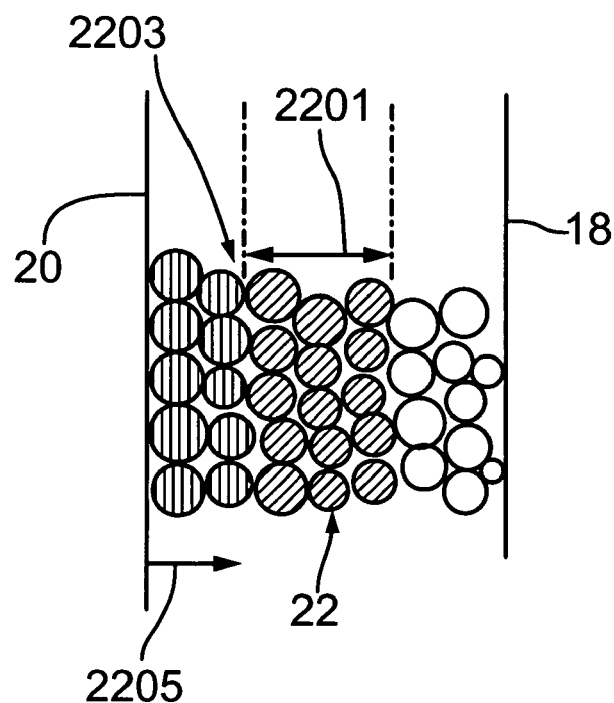

As used herein, the term "mixed ion exchange material domain 22" means either of the following:

(a) a domain 22 is a space within the compartment 12, comprising ion exchange material, and includes the following characteristics: (i) the domain 22 includes anion exchange material and cation exchange material, wherein the volumetric ratio of anion exchange material to cation exchange material within the domain 22 is defined by γ, wherein the γ of the domain 22 is between about 1:4 and about 4:1, (ii) the domain 22 comprises at least about 10 volume % anion exchange material based on the total volume of the domain 22 and also comprises at least about 10 volume % cation exchange material based on the total volume of the domain 22, (iii) the domain 22 has a minimum thickness 221 of at least about 0.2 millimeters, wherein the thickness 221 is measured from a point 223 on the domain 22 closest to either of the anion permeable membrane 18 or cation permeable membrane 20 and in a direction parallel to an axis 225 normal to either of the anion permeable membrane 18 or the cation permeable membrane 20 (see FIG. 48, where, for this illustrated example, the axis 225 is taken as an axis 225 normal to the cation permeable membrane 20, and the point 223 is taken as the point 223 on the domain 22 closest to the cation permeable membrane 20), and (iv) the domain 22 is sufficiently porous so as to be effective in permitting flow of liquid therethrough, and, to this end, is characterized by a water permeability (or, the inverse of "specific pressure loss" of the domain) of between about $6 \times 10^{-7}$ L/min/cm/psi and about 1.5 L/min/cm/psi, or (b) a domain 22 is a space within the compartment 12, comprising ion amphoteric material conductive to both anionic and cationic species, wherein such domain 22 has a minimum thickness of at least about 0.2 millimeters, wherein the minimum thickness 2201 is measured from a point 2203 on the domain 22 closest to the anion permeable membrane 18 or cation permeable membrane 20 and in a direction parallel to an axis 2205 normal to either of the anion permeable membrane 18 or the cation permeable membrane 20 (see FIG. 49, where, for this illustrated example, the axis 2205 is taken as an axis 2205 normal to the cation permeable membrane 20, and the point 2203 is taken as the point 2203 on the domain 22 closest to the cation permeable membrane 20), and (iv) the domain 22 is sufficiently porous so as to be effective in permitting flow of liquid therethrough, and, to this end, is characterized by a water permeability (or, the inverse of "specific pressure loss" of the domain) of between about $6 \times 10^{-7}$ L/min/cm/psi and about 1.5 L/min/cm/psi.

For example, either of part (a) or part (b) defines a domain 22 having a minimum thickness equivalent to the thickness of at least one particle diameter, and the thickness of one particle diameter is at least about 0.2 millimeters.

It is to be understood that a "portion" of a mixed ion exchange material domain 22 includes the same characteristics of a "mixed ion exchange material domain 22", as described above, and a difference is that a portion of a mixed ion exchange material domain 22 is adjacent to at least one further portion of the same mixed ion exchange material domain 22, such that the mixed ion exchange material domain 22 comprises these portions.

It is also to be understood that a mixed ion exchange material domain 22 may be contemporaneously disposed in one or more "spaces", and this depends on how such spaces are defined. Further, it is understood that two or more of the defined spaces can intersect to form an intersection such that at least a portion of each of the two or more of the defined spaces are co-located in the intersection, and that, in such circumstances, when at least a portion of the mixed ion exchange material domain 22 is disposed within the intersection, the at least a portion of the mixed ion exchange material domain 22 is also said to be disposed within each of the two or more defined spaces.

The term "substantially any remaining fractions", as the term is used herein in relation to ion-concentrating compartment side surfaces, is intended to mean either:

(a) almost all of any remaining fractions, or (b) all of any remaining fractions, wherein "remaining fractions" means those fractions of an ion-concentrating compartment side surface (of an anion permeable membrane or a cation permeable membrane) other than the operative side surface fraction. Where the operative side surface fraction is defined by the entire ion-concentrating compartment side surface of an anion permeable membrane or a cation permeable membrane, there is no "remaining fractions".

Spacers 38, 40 are interposed between the alternating anion and cation permeable membranes 18, 20 so as to maintain spacing between opposing anion and cation permeable membranes 18, 20 and thereby provide compartments 12, 36 with respective flowpaths for liquid flow. Examples of suitable spacers 38, 40 for the electrodeionization apparatus 10 are described in U.S. Pat. No. 6,929,765 and U.S. Patent Publication No. US 2004/0104166 A1. These examples of spacers illustrate spacers with a mesh, wherein the mesh is provided to maintain spacing between opposing membranes, or an opposing membrane and an end frame assembly, of the ion-concentrating compartments of the electrodeionization apparatus 10, and thereby facilitate provision of a fluid flowpath within the ion-concentrating compartments. It is understood that ion-concentrating compartments containing ion exchange material do not necessarily require spacers with mesh, as the ion exchange material within the ion-concentrating compartments facilitate the provision of a flowpath in the compartments. Having said that, ion-concentrating compartments whose construction includes spacers with mesh are not precluded from the scope of the invention. Accordingly, suitable spacers include spacers with or without a mesh.

Referring to FIGS. 44 and 45, the anode and cathode compartments 30, 34 are provided at terminal ends of the apparatus 10. Each compartment 30, 34 has a respective flowpath defined between and bounded by a respective electrode end frame assembly 42, 44, and a respective membrane which is pressed against the respective electrode end frame assembly 42, 44. To assemble the apparatus 10, each of the anion permeable membranes 18, cation permeable membranes 20, and associated spacers 38, 40 and end frame assemblies 42, 44 are forced together to create a substantially fluid tight arrangement. An example of the construction of an electrodeionization apparatus is provided in U.S. Pat. No. 6,193,869. Alternatively, components in an electrodeionization apparatus can be maintained coupled together by means of a hydraulic press and/or tie rods.

(b) First Embodiment of EDI Apparatus Having an Ion Concentrating Compartment Containing Ion Exchange Material In one embodiment, and referring to FIGS. 2 to 13, the ion-concentrating compartment 12 of an electrodeionization apparatus 10 is partially bounded by an anion permeable membrane 18 and also partially bounded by a cation permeable membrane 20. A first ion exchange material domain is provided and disposed within the ion-concentrating compartment 12. The first ion exchange material domain is contiguous with at least a portion of an ion-concentrating compartment side surface of one of the anion permeable membrane 18 and the cation permeable membrane 20. The first ion exchange material domain is spaced apart from the other one of the one of the anion permeable membrane and the cation permeable membrane. Referring to FIG. 2, where the one of the anion permeable membrane 18 and the cation permeable membrane 20, having the at least a portion of an ion-concentrating compartment side surface with which the first ion exchange material domain is contiguous, is an anion permeable membrane 18, the first ion exchange material is an anion exchange material predominant domain 14. Referring to FIG. 3, where the one of the anion permeable membrane 18 and the cation permeable membrane 20, having the at least a portion of an ion-concentrating compartment side surface with which the first ion exchange material domain is contiguous, is a cation permeable membrane 20, the first ion exchange material domain is a cation exchange material predominant domain 16.

For example, a second ion exchange material domain is also provided and disposed within the ion-concentrating compartment 12. The second ion exchange material domain is contiguous with substantially the entire ion-concentrating compartment side surface of the other one of the one of the anion permeable membrane and the cation permeable membrane. Referring to FIG. 2, where the one of the anion permeable membrane 18 and the cation permeable membrane 20, having the at least a portion of an ion-concentrating compartment side surface with which the first ion exchange material domain is contiguous, is an anion permeable membrane 18, the second ion exchange material domain is a non-anion exchange material predominant domain 161. For example, the non-anion exchange material predominant domain 161 includes a cation exchange material predominant domain 16, or the domain 161 is a cation exchange material predominant domain 16 in its entirety. As a further example, the non-anion exchange material predominant domain 161 includes a mixed ion exchange material domain 22, or the domain 161 is a mixed ion exchange material domain 22 in its entirety. As yet a further example, the domain 161 is contiguous with the domain 14. Referring to FIG. 3, where the one of the anion permeable membrane 18 and the cation permeable membrane 20, having the at least a portion of an ion-concentrating compartment side surface with which the first ion exchange material domain is contiguous, is a cation permeable membrane 20, the second ion exchange material domain is a non-cation exchange material predominant domain 141. For example, the non-cation exchange material predominant domain 141 includes an anion exchange material predominant domain 14, or the domain 141 is an anion exchange material predominant domain 14 in its entirety. As a further example, the non-cation exchange material predominant domain 141 includes a mixed ion exchange material domain 22, or the domain 141 is a mixed ion exchange material domain 22 in its entirety. As yet a further example, the domain 141 is contiguous with the domain 16.

With respect to the ion-concentrating compartment 12 partially bounded by an anion permeable membrane 18 and also partially bounded by a cation permeable membrane 20, for example, and referring to FIG. 4, an anion exchange material predominant domain 14 and a cation exchange material predominant domain 16 are provided and disposed within the ion-concentrating compartment 12. The anion exchange material predominant domain 14 is contiguous with at least a portion of the surface 26 of the membrane 18, and is spaced apart from the membrane 20. The cation exchange material predominant domain 16, is contiguous with at least a portion of an ion-concentrating compartment side surface 28 of the cation permeable membrane 20, and is spaced apart from the membrane 18. For example, the domain 14 is contiguous with the domain 16.

Figure 5:
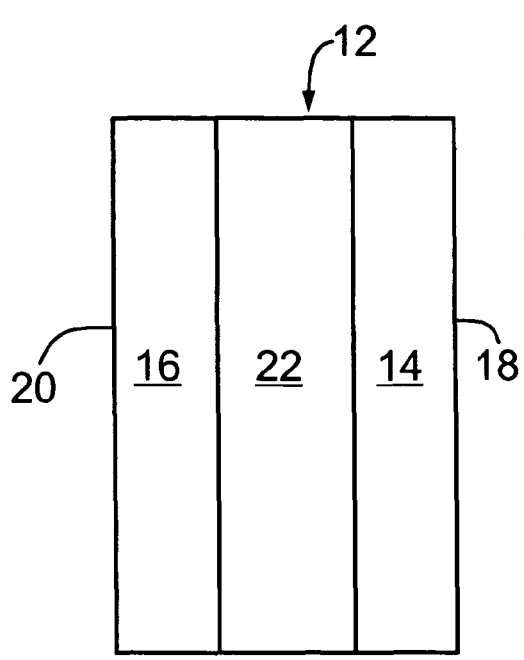

With respect to the ion-concentrating compartment 12 partially bounded by an anion permeable membrane 18 and also partially bounded by a cation permeable membrane 20, for example, and referring to FIG. 5, an anion exchange material predominant domain 14 is provided and disposed within the ion-concentrating compartment 12, and a cation exchange material predominant domain 16 is provided and disposed within the ion-concentrating compartment 12, and a mixed ion exchange material domain 22 is provided and disposed within the ion-concentrating compartment 12. The anion exchange material predominant domain 14 is contiguous with at least a portion of the surface 26 of the membrane 18, and is spaced apart from the membrane 20. The disposition of the anion exchange material predominant domain 14 relative to the cation permeable membrane 20 defines a respective first space between the domain 14 and the membrane 20. The cation exchange material predominant domain 16 is contiguous with at least a portion of the surface 28 of the membrane 20, and is spaced apart from the membrane 18. The disposition of the cation exchange material predominant domain 16 relative to the anion permeable membrane 18 defines a respective second space between the domain 16 and the membrane 18. At least a portion of the mixed ion exchange material domain 22 is disposed within at least one of the respective first and second spaces. For example, the domain 22 is contiguous with each of the domains 14 and 16.

Figure 6:
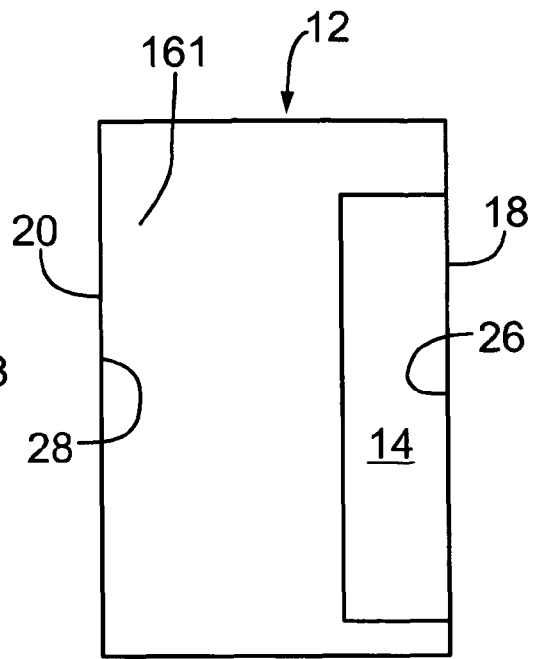
Figure 7:
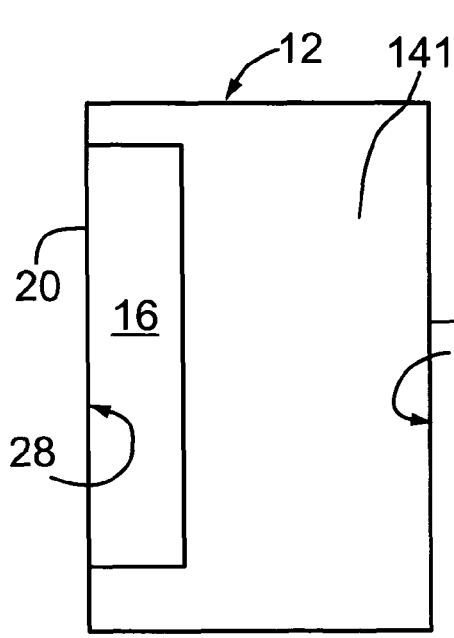
Figure 8:
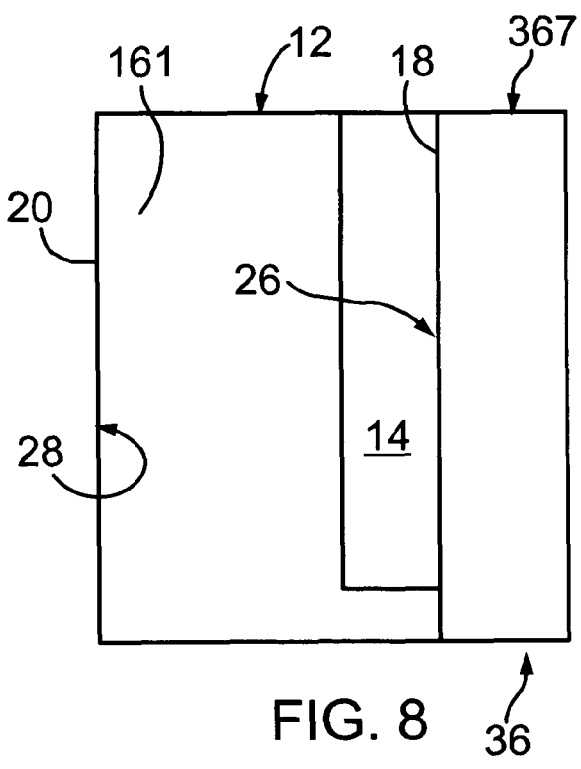
Figures 9, 10:
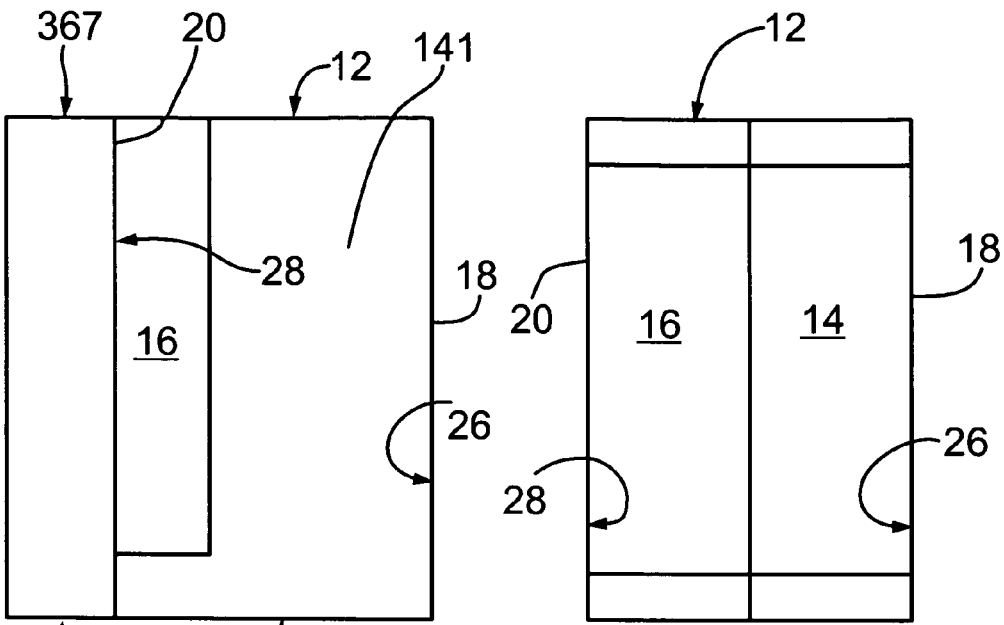

With respect to the ion-concentrating compartment 12 partially bounded by an anion permeable membrane 18 and also partially bounded by a cation permeable membrane 20, for example, and referring to FIGS. 6 and 7, each of the anion permeable membrane 18 and the cation permeable membrane 20 includes a respective ion-concentrating compartment side surface 26, 28, wherein each surface 26, 28 has a respective surface area. A first ion exchange material is provided and disposed within the ion-concentrating compartment 12, and is contiguous with at least a portion of the ion-concentrating compartment side surface 26 or 28 of the one of the anion permeable membrane 18 and the cation permeable membrane 20, and is also spaced apart from the other one of the one of the anion permeable membrane and the cation permeable membrane. The at least a portion of the side surface 26 or 28 of the one of the anion permeable membrane 18 and the cation permeable membrane 20 defines an operative side surface fraction of the ion-concentrating compartment side surface 26 or 28 of the one of the anion permeable membrane 18 and the cation permeable membrane 20. The operative side surface fraction of the ion-concentrating compartment side surface 26 or 28 of the one of the anion permeable membrane 18 and the cation permeable membrane 20 defines an operative side surface area fraction of the ion-concentrating compartment side surface 26 or 28 of the one of the anion permeable membrane 18 and the cation permeable membrane 20 which is at least 10% of the ion-concentrating compartment side surface area of the one of the anion permeable membrane 18 and the cation permeable membrane 20. For example, with respect to the relative size of the operative side surface area fraction of the ion-concentrating compartment side surface 26 or 28 of the one of the anion permeable membrane 18 and the cation permeable membrane 20, the operative side surface area fraction of the ion-concentrating compartment side surface 26 or 28 of the one of the anion permeable membrane 18 and the cation permeable membrane 20 is at least 50% of the ion-concentrating compartment side surface area of the one of the anion permeable membrane 18 and the cation permeable membrane 20. As a further example, with respect to the relative size of the operative side surface area fraction of the ion-concentrating compartment side surface 26 or 28 of the one of the anion permeable membrane 18 and the cation permeable membrane 20, the operative side surface area fraction of the ion-concentrating compartment side surface 26 or 28 of the one of the anion permeable membrane 18 and the cation permeable membrane 20 is substantially the entire ion-concentrating compartment side surface area of the one of the anion permeable membrane 18 and the cation permeable membrane 20. For example, and referring to FIGS. 8 and 9, with respect to the spatial disposition of the operative side surface fraction of the ion-concentrating compartment side surface 26 or 28 of the one of the anion permeable membrane 18 and the cation permeable membrane 20, the operative side surface fraction of the ion-concentrating compartment side surface 26 or 28 of the one of the anion permeable membrane 18 and the cation permeable membrane 20, in comparison to substantially any remaining fractions of the ion-concentrating compartment side surface 26 or 28 of the one of the anion permeable membrane 18 and the cation permeable membrane 20, is closest to an outlet 367 of an ion-depleting compartment 36 disposed on an opposite side of the one of the anion permeable membrane 18 and the cation permeable membrane 20. Referring to FIGS. 6 and 8, where the at least a portion of the ion-concentrating compartment side surface 26 or 28 of the one of the anion permeable membrane 18 and the cation permeable membrane 20 with which the first ion exchange material domain is contiguous is of an anion permeable membrane 18, the first ion exchange material domain is an anion exchange material predominant domain 14. Referring to FIGS. 7 and 9, where the at least a portion of the ion-concentrating compartment side surface 26 or 28 of the one of the anion permeable membrane 18 and the cation permeable membrane 20 with which the first ion exchange material domain is contiguous is of a cation permeable membrane 20, the first ion exchange material domain is a cation exchange material predominant domain 16.

For example, a second ion exchange material domain is provided and disposed within the ion-concentrating compartment 12 and is contiguous with substantially the entire ion-concentrating compartment side surface of the other one of the one of the anion permeable membrane and the cation permeable membrane. Referring to FIGS. 6 and 8, where the at least a portion of the ion-concentrating compartment side surface 26 or 28 of the one of the anion permeable membrane 18 and the cation permeable membrane 20 with which the first ion exchange material domain is contiguous is of an anion permeable membrane 18, the second ion exchange material domain is a non-anion exchange material predominant domain 161. For example, the non-anion exchange material predominant domain 161 includes a cation exchange material predominant domain 16, or the domain 161 is a cation exchange material predominant domain 16 in its entirety. As a further example, the domain 161 includes a mixed ion exchange material domain 22, or the domain 161 is a mixed ion exchange material domain 22 in its entirety. As yet a further example, the domain 161 is contiguous with the domain 14. Referring to FIGS. 7 and 9, where the at least a portion of the ion-concentrating compartment side surface 26 or 28 of the one of the anion permeable membrane 18 and the cation permeable membrane 20 with which the first ion exchange material domain is contiguous, is of a cation permeable membrane 20, the second ion exchange material domain is a non-cation exchange material predominant domain 141. For example, the non-cation exchange material predominant domain 141 includes an anion exchange material predominant domain 14, or the domain 141 is an anion exchange material predominant domain 14 in its entirety. As a further example, the domain 141 includes a mixed ion exchange material domain 22, or the domain 141 is a mixed ion exchange material domain 22 in its entirety. As yet a further example, the domain 141 is contiguous with the domain 16.

With respect to the ion-concentrating compartment 12 partially bounded by an anion permeable membrane 18 and also partially bounded by a cation permeable membrane 20, for example, and referring to FIG. 10, each of the anion permeable membrane 18 and the cation permeable membrane 20 includes a respective ion-concentrating compartment side surface 26, 28, wherein each surface 26, 28 has a respective surface area, and an anion exchange material predominant domain 14 is provided and disposed within the ion-concentrating compartment, and a cation exchange material predominant domain 16 is provided and disposed within the ion-concentrating compartment. The anion exchange material predominant domain 14 is contiguous with at least a portion of the ion-concentrating compartment side surface 26 of the anion permeable membrane 18, and is spaced apart from the cation permeable membrane 20. The at least a portion of the side surface 26 of the anion permeable membrane 18 defines an operative side surface fraction of the ion-concentrating compartment side surface 26 of the anion permeable membrane 18. The operative side surface fraction of the ion-concentrating compartment side surface 26 of the anion permeable membrane 18 defines an operative side surface area fraction of the ion-concentrating compartment side surface 26 of the anion permeable membrane 18 which is at least 10% of the ion-concentrating compartment side surface area of the anion permeable membrane 18. For example, with respect to the relative size of the operative side surface area fraction of the ion-concentrating compartment side surface 26 of the anion permeable membrane 18, the operative side surface area fraction of the ion-concentrating compartment side surface 26 of the anion permeable membrane 18 is at least 50% of the ion-concentrating compartment side surface area of the anion permeable membrane 18. As a further example, with respect to the relative size of the operative side surface area fraction of the ion-concentrating compartment side surface 26 of the anion permeable membrane 18, the operative side surface area fraction of the ion-concentrating compartment side surface 26 of the anion permeable membrane 18 is substantially the entire ion-concentrating compartment side surface area of the anion permeable membrane 18. The cation exchange material predominant domain 16 is contiguous with at least a portion of the ion-concentrating compartment side surface 28 of the cation permeable membrane 20, and is spaced apart from the anion permeable membrane 18. The at least a portion of the side surface 28 of the cation permeable membrane 20 defines an operative side surface fraction of the ion-concentrating compartment side surface 28 of the cation permeable membrane 20. The operative side surface fraction of the ion-concentrating compartment side surface 28 of the cation permeable membrane 20 defines an operative side surface area fraction of the ion-concentrating compartment side surface 28 of the cation permeable membrane 20 which is at least 10% of the ion-concentrating compartment side surface area of the cation permeable membrane 20. For example, with respect to the relative size of the operative side surface area fraction of the ion-concentrating compartment side surface 28 of the cation permeable membrane 20, the operative side surface area fraction of the ion-concentrating compartment side surface 28 of the cation permeable membrane 20 is at least 50% of the ion-concentrating compartment side surface area of the cation permeable membrane 20. As a further example, with respect to the relative size of the operative side surface area fraction of the ion-concentrating compartment side surface 28 of the cation permeable membrane 20, the operative side surface area fraction of the ion-concentrating compartment side surface 28 of the cation permeable membrane 20 is substantially the entire ion-concentrating compartment side surface area of the cation permeable membrane 20. For example, and referring to FIG. 11, with respect to the spatial disposition of the operative side surface fraction of the ion-concentrating compartment side surface 26 of the anion permeable membrane 18, the operative side surface fraction of the ion-concentrating compartment side surface 26 of the anion permeable membrane 18, in comparison to substantially any remaining fractions of the ion-concentrating compartment side surface 26 of the anion permeable membrane 18, is closest to an outlet 367 of an ion-depleting compartment 36 disposed on an opposite side of the anion permeable membrane 18. With respect to the spatial disposition of the operative side surface fraction of the ion-concentrating compartment side surface 28 of the cation permeable membrane 20, for example, the operative side surface fraction of the ion-concentrating compartment side surface 28 of the cation permeable membrane 20, in comparison to substantially any remaining fractions of the ion-concentrating compartment side surface 28 of the cation permeable membrane 20, is closest to an outlet 367 of an ion-depleting compartment 36 disposed on an opposite side of the cation permeable membrane 20. For example, the domain 14 is contiguous with the domain 16.

Figures 11, 12:
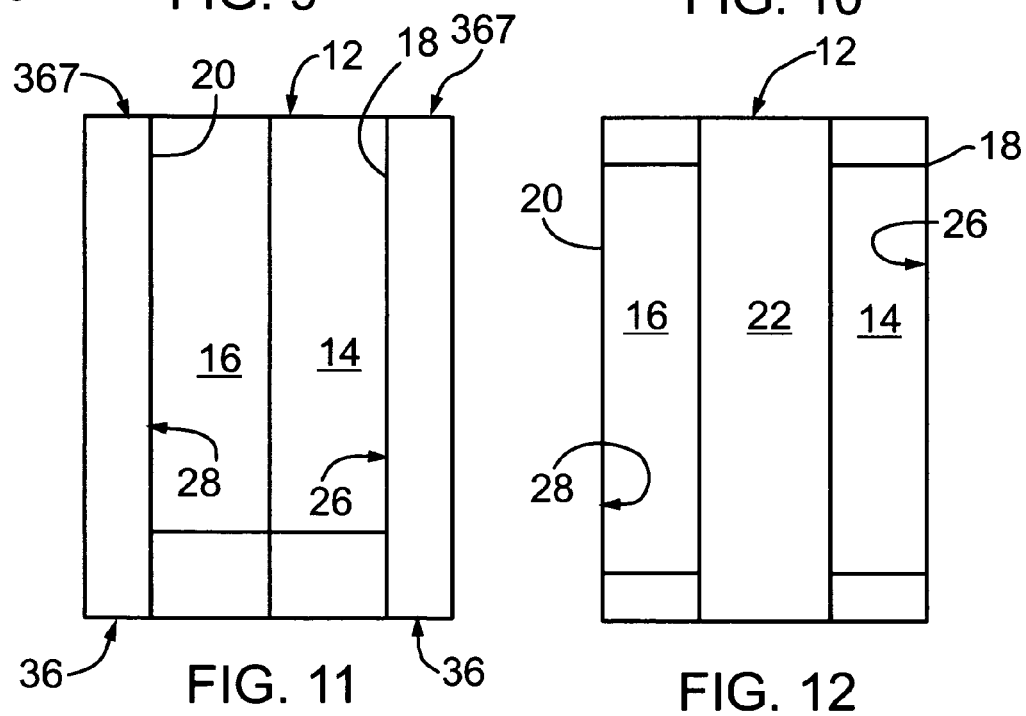
Figure 13:
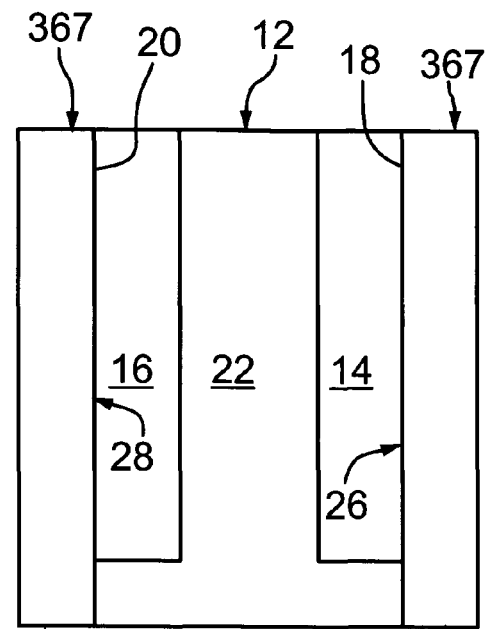

With respect to the ion-concentrating compartment 12 partially bounded by an anion permeable membrane 18 and also partially bounded by a cation permeable membrane 20, for example, and referring to FIG. 12, each of the anion permeable membrane 18 and the cation permeable membrane 20 includes a respective ion-concentrating compartment side surface 26, 28, wherein each surface 26, 28 has a respective surface area. An anion exchange material predominant domain 14 is provided and disposed within the ion-concentrating compartment 12, and a cation exchange material predominant domain 16 is provided and disposed within the ion-concentrating compartment 12, and a mixed ion exchange material domain 22 is provided and disposed within the ion-concentrating compartment 12. The anion exchange material predominant domain 14 is contiguous with at least a portion of the ion-concentrating compartment side surface 26 of the anion permeable membrane 18, and is spaced apart from the cation permeable membrane 20. The disposition of the anion exchange material predominant domain 14 relative to the cation permeable membrane 20 defines a respective first space between the domain 14 and the membrane 20. The at least a portion of the side surface 26 of the anion permeable membrane 18 defines an operative side surface fraction of the ion-concentrating compartment side surface 26 of the anion permeable membrane 18. The operative side surface fraction of the ion-concentrating compartment side surface 26 of the anion permeable membrane 18 defines an operative side surface area fraction of the ion-concentrating compartment side surface 26 of the anion permeable membrane 18 which is at least 10% of the ion-concentrating compartment side surface area of the anion permeable membrane 18. For example, with respect to the relative size of the operative side surface area fraction of the ion-concentrating compartment side surface 26 of the anion permeable membrane 18, the operative side surface area fraction of the ion-concentrating compartment side surface 26 of the anion permeable membrane 18 is at least 50% of the ion-concentrating compartment side surface area of the anion permeable membrane 18. As a further example, with respect to the relative size of the operative side surface area fraction of the ion-concentrating compartment side surface 26 of the anion permeable membrane 18, the operative side surface area fraction of the ion-concentrating compartment side surface 26 of the anion permeable membrane 18 is substantially the entire ion-concentrating compartment side surface area of the anion permeable membrane 18. The cation exchange material predominant domain 16 is contiguous with at least a portion of the ion-concentrating compartment side surface 28 of the cation permeable membrane 20, and is spaced apart from the anion permeable membrane 20. The disposition of the cation exchange material predominant domain 16 relative to the anion permeable membrane 18 defines a respective second space between the domain 16 and the membrane 18. The at least a portion of the side surface 28 of the cation permeable membrane 20 defines an operative side surface fraction of the ion-concentrating compartment side surface 28 of the cation permeable membrane 20. The operative side surface fraction of the ion-concentrating compartment side surface 28 of the cation permeable membrane 20 defines an operative side surface area fraction of the ion-concentrating compartment side surface 28 of the cation permeable membrane 20 which is at least 10% of the ion-concentrating compartment side surface area of the cation permeable membrane 20. For example, with respect to the relative size of the operative side surface area fraction of the ion-concentrating compartment side surface 28 of the cation permeable membrane 20, the operative side surface area fraction of the ion-concentrating compartment side surface 28 of the cation permeable membrane 20 is at least 50% of the ion-concentrating compartment side surface area of the cation permeable membrane 20. As a further example, with respect to the relative size of the operative side surface area fraction of the ion-concentrating compartment side surface 28 of the cation permeable membrane 20, the operative side surface area fraction of the ion-concentrating compartment side surface 28 of the cation permeable membrane 20 is substantially the entire ion-concentrating compartment side surface area of the cation permeable membrane 20. For example, and referring to FIG. 13, with respect to the spatial disposition of the operative side surface fraction of the ion-concentrating compartment side surface 26 of the anion permeable membrane 18, the operative side surface fraction of the ion-concentrating compartment side surface 26 of the anion permeable membrane 18, in comparison to substantially any remaining fractions of the ion-concentrating compartment side surface 26 of the anion permeable membrane 18, is closest to an outlet 367 of an ion-depleting compartment 36 disposed on an opposite side of the anion permeable membrane 18. With respect to the spatial disposition of the operative side surface fraction of the ion-concentrating compartment side surface 28 of the cation permeable membrane 20, for example, the operative side surface fraction of the ion-concentrating compartment side surface 28 of the cation permeable membrane 20, for example, in comparison to substantially any remaining fractions of the ion-concentrating compartment side surface 28 of the cation permeable membrane 20, is closest to an outlet 367 of an ion-depleting compartment 36 disposed on an opposite side of the cation permeable membrane 20. At least a portion of the mixed ion exchange material domain 22 is disposed within at least one of the respective first and second spaces. For example the domain 22 is contiguous with each of the domains 14 and 16.

Figure 14:
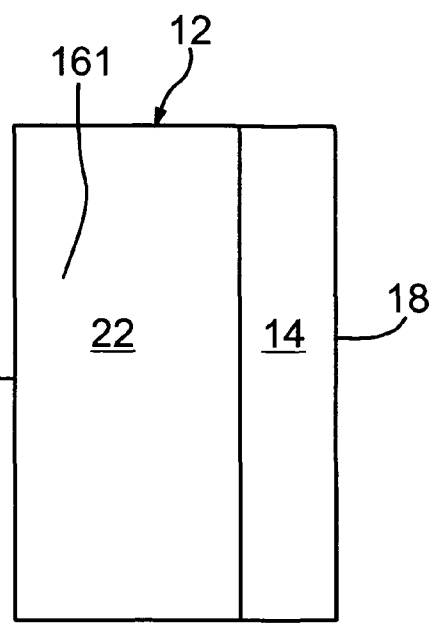
Figure 15:
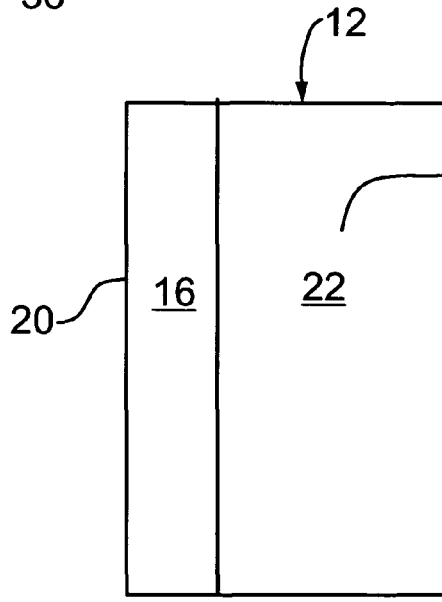

(c) Second Embodiment of EDI Apparatus Having an Ion Concentrating Compartment Containing Ion Exchange Material In another embodiment, and referring to FIGS. 14 to 34, the ion-concentrating compartment 12 of an electrode ionization apparatus 10 is partially bounded by a first ion permeable membrane and also partially bounded by a separator element 24. The first ion permeable membrane is one of an anion permeable membrane 18 and a cation permeable membrane 20. A first ion exchange material domain is disposed within the ion-concentrating compartment 12 and is contiguous with at least a portion of an ion-concentrating compartment side surface of the first ion permeable membrane 18 or 20. Where the first ion permeable membrane, having the at least a portion of an ion-concentrating compartment side surface with which the first ion exchange material domain is contiguous, is an anion permeable membrane 18 (see FIG. 14), the first ion exchange material domain is an anion exchange material predominant domain 14. Where the first ion permeable membrane, having the at least a portion of an ion-concentrating compartment side surface with which the first ion exchange material domain is contiguous, is a cation permeable membrane 20 (see FIG. 15), the first ion exchange material domain is a cation exchange material predominant domain 16. A second ion exchange material domain is also disposed within the ion-concentrating compartment 12. The disposition of the first ion exchange material domain 14 or 16 relative to the separator element 24 defines a respective space between the first ion exchange material domain 14 or 16 and the separator element 24, wherein at least a portion of the second ion exchange material domain is disposed within the respective space. For example, the second ion exchange material domain is contiguous with the first ion exchange material domain. As a further example, where the separator element 24 is a second ion permeable membrane, wherein the second ion permeable membrane is the other one of the anion permeable membrane 18 and the cation permeable membrane 20, the second ion exchange material domain is contiguous with the other one of the one of the anion permeable membrane and the cation permeable membrane. In the case where the first ion exchange material domain is an anion exchange material predominant domain 14, the second ion exchange material domain is a non-anion exchange material predominant domain 161. For example, and referring to FIG. 14, the domain 161 includes a mixed ion exchange material domain 22, or the domain 161 is a mixed ion exchange material domain 22 in its entirety. As a further example, the domain 161 includes a cation exchange material predominant domain 16, or the domain 161 is a cation exchange material predominant domain 16 in its entirety. In the case where the first ion exchange material domain is a cation exchange material predominant domain 16, the second ion exchange material domain is a non-cation exchange material predominant domain 141. For example, and referring to FIG. 15, the domain 141 includes a mixed ion exchange material domain 22, or the domain 141 is a mixed ion exchange material domain 22 in its entirety. As a further example, the domain 141 includes an anion exchange material predominant domain 14, or the domain 141 is an anion exchange material predominant domain 14 in its entirety. For example, with respect to the separator element 24, the separator element is substantially impermeable, such as where the separator element 24 is an electrode. As a further example, with respect to the separator element, the separator element is a second ion permeable membrane, where the second ion permeable membrane is the other one of the one of the anion permeable membrane 18 and the cation permeable membrane 20.

In this embodiment, the first ion exchange material 14 or 16 is not required to be spaced apart from the separator element 24. In this respect, for example, and referring to FIG. 20, where the separator element 24 is an anion permeable membrane 18, an ion concentrating compartment 12 is provided and is partially bounded by an anion permeable membrane 18 and is also partially bounded by a cation permeable membrane 20. A cation exchange material predominant domain 16 is disposed within the ion-concentrating compartment 12 and is contiguous with at least a portion of an ion-concentrating compartment side surface of the cation permeable membrane 20. A mixed ion exchange material domain 22 is disposed within the ion-concentrating compartment 12. The disposition of the domain 16 relative to anion permeable membrane 18 defines a respective space between the domain 16 and the membrane 18. At least a portion of the mixed ion exchange material domain 22 is disposed within the respective space. Also, the domain 22 is contiguous with the domain 16. Notably, the domain 16 is also contiguous with a portion 18a of the anion permeable membrane 18.

Figure 16:
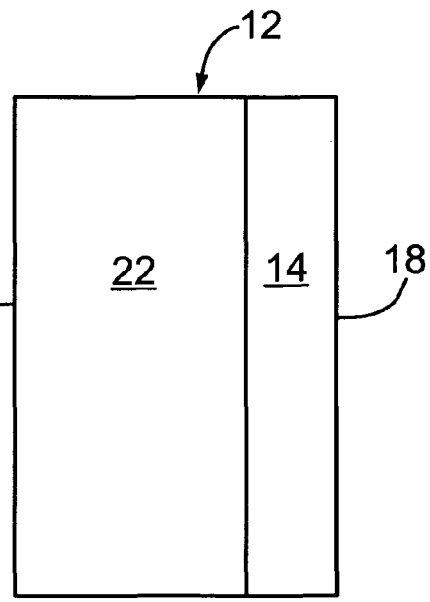

With respect to the ion-concentrating compartment 12 partially bounded by an anion permeable membrane 18 and also partially bounded by a separator element 24, and where the separator element 24 is an electrode 25, for example, and referring to FIG. 16, an anion exchange material predominant domain 14 is disposed within the ion-concentrating compartment 12 and is contiguous with at least a portion of an ion-concentrating compartment side surface of the anion permeable membrane 18. A mixed ion exchange material domain 22 is also disposed within the ion-concentrating compartment 12. The disposition of the anion exchange material predominant domain 14 relative to the electrode 25 defines a respective space between the domain 14 and the electrode 25, wherein at least a portion of the mixed ion exchange material domain 22 is disposed within the respective space. For example, the domain 22 is contiguous with the domain 14. For example, this may be the case for an anode compartment 30, where the electrode 25 is an anode 32.

Figures 17, 18:
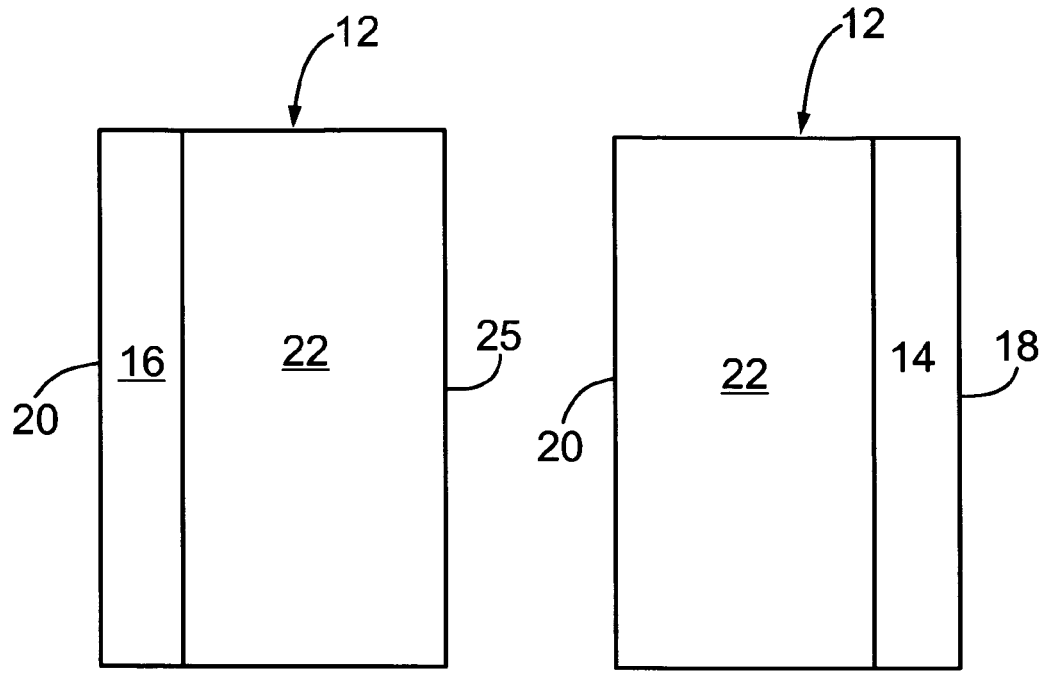

With respect to the ion-concentrating compartment 12 partially bounded by a cation permeable membrane 20 and also partially bounded by a separator element 24, and where the separator element 24 is an electrode 25, for example, and referring to FIG. 17, a cation exchange material predominant domain 16 is disposed within the ion-concentrating compartment 12 and is also contiguous with at least a portion of an ion-concentrating compartment side surface of the cation permeable membrane 20. A mixed ion exchange material domain 22 is also disposed within the ion-concentrating compartment 12. The disposition of the cation exchange material predominant domain 16 relative to the electrode 25 defines a respective space between the domain 16 and the electrode 25, wherein at least a portion of the mixed ion exchange material phase domain 22 is disposed within the respective space. For example, the domain 22 is contiguous with the domain 16. For example, this may be the case for the cathode compartment 34, where the electrode 25 is a cathode 35.

Figures 19, 20:
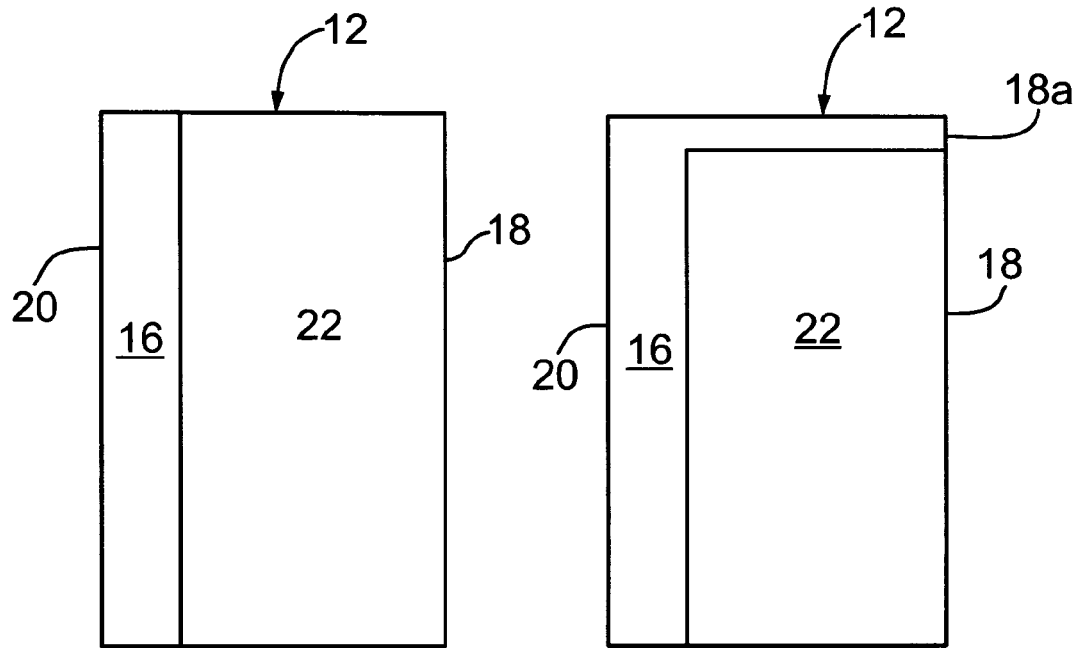

With respect to the ion-concentrating compartment 12 partially bounded by an anion permeable membrane 18 and also partially bounded by a cation permeable membrane 20, for example, and referring to FIGS. 18 and 19, a first ion exchange material domain 14 or 16 is disposed within the ion-concentrating compartment 12 and is also contiguous with at least a portion of an ion-concentrating compartment side surface of one of the anion permeable membrane 18 and the cation permeable membrane 20. Where the one of the anion permeable membrane 18 and the cation permeable membrane 20, having the at least a portion of an ion-concentrating compartment side surface with which the first ion exchange material domain is contiguous, is an anion permeable membrane 18 (see FIG. 18), the first ion exchange material domain is an anion exchange material predominant domain 14. Where the one of the anion permeable membrane 18 and the cation permeable membrane 20, having the at least a portion of an ion-concentrating compartment side surface which the first ion exchange material domain is contiguous, is a cation permeable membrane 20 (see FIG. 19), the first ion exchange material domain is a cation exchange material predominant domain 16. A mixed ion exchange material phase domain 22 is also disposed within the ion-concentrating compartment. The disposition of the first ion exchange material domain 14 or 16 relative to the other one of the one of the anion permeable membrane 18 and the cation permeable membrane 20 defines a respective space between the first ion exchange material domain 14 or 16 and the other one of the one of membranes 18 and 20, wherein at least a portion of the mixed ion exchange material domain 22 is disposed within the respective space. For example, the domain 22 is contiguous with the first ion exchange domain 14 or 16.

Figure 21:
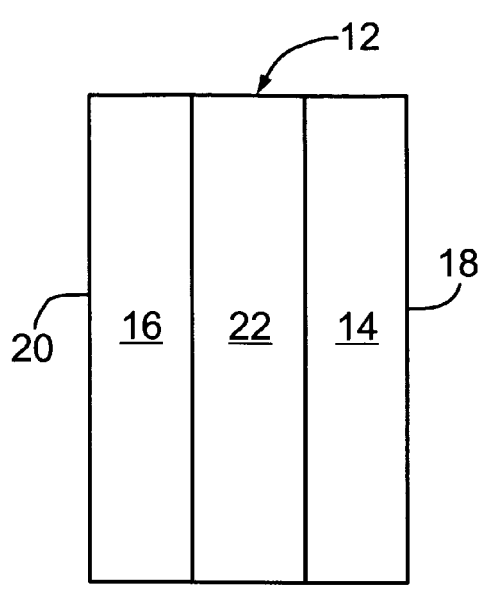

With respect to the ion-concentrating compartment 12 partially bounded by an anion permeable membrane 18 and also partially bounded by a cation permeable membrane 20, for example, and referring to FIG. 21, an anion exchange material predominant domain 14 is disposed within the ion-concentrating compartment 12, a cation exchange material predominant domain 16 is disposed within the ion-concentrating compartment 12, and a mixed ion exchange material domain 22 is disposed within the ion-concentrating compartment 12. The anion exchange material predominant domain 14 is disposed contiguous with at least a portion of an ion-concentrating compartment side surface of the anion permeable membrane 18. The cation exchange material predominant domain 16 is disposed contiguous with at least a portion of an ion-concentrating compartment side surface of the cation permeable membrane 20. The disposition of the anion exchange material predominant domain 14 relative to the cation permeable membrane 20 defines a respective first space between the domain 14 and the membrane 20, and the disposition of the cation exchange material predominant domain 16 relative to the anion permeable membrane 18 defines a respective second space between the domain 16 and the membrane 18, wherein at least a portion of the mixed ion exchange material domain 22 is disposed within at least one of the respective first and second spaces. For example, the domain 22 is contiguous with each of the domains 14 and 16.

Figure 22:
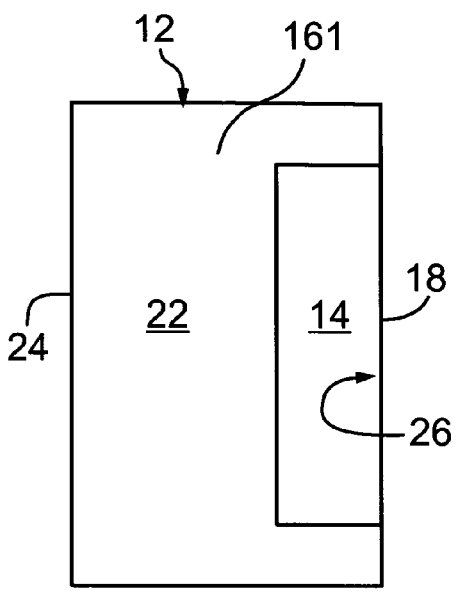
Figure 23:
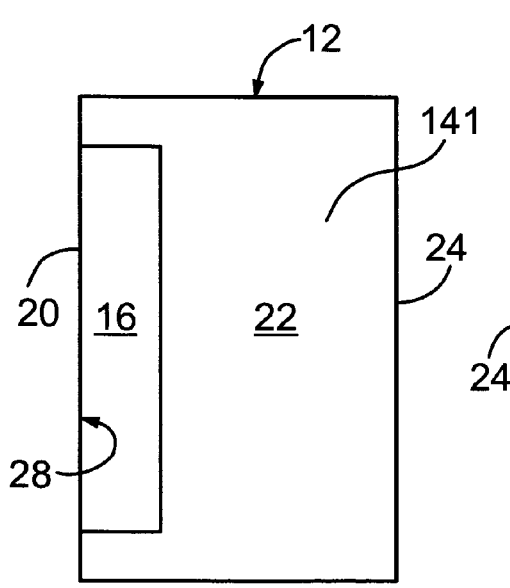
Figure 24:
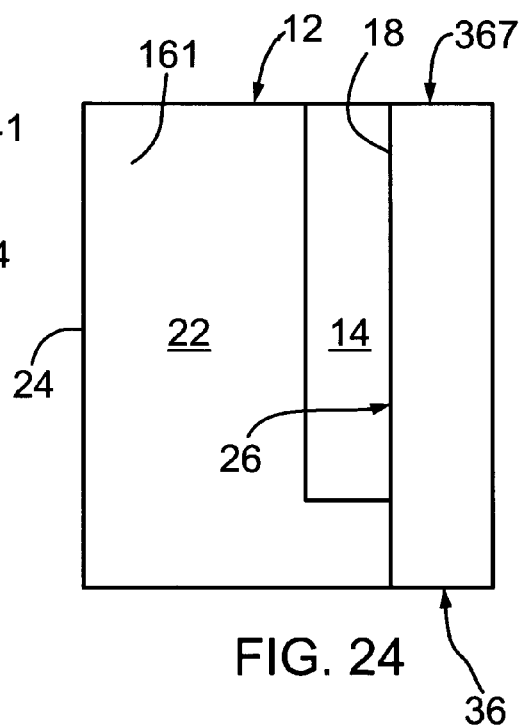
Figure 29:
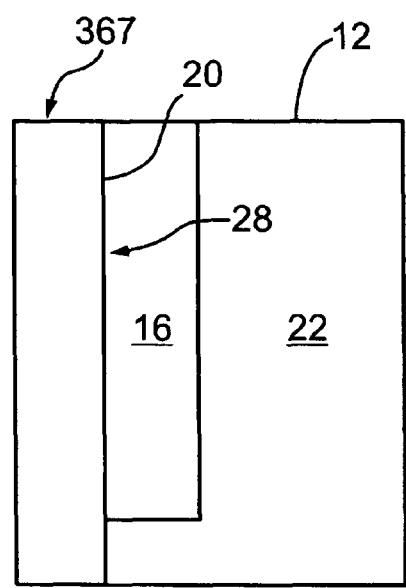

With respect to the ion-concentrating compartment partially bounded by an ion permeable membrane, wherein the ion permeable membrane is one of an anion permeable membrane 18 and a cation permeable membrane 20, and also partially bounded by a separator element 24, for example, and referring to FIGS. 22 and 23, a first ion exchange material domain 14 or 16 is disposed within the ion-concentrating compartment 12, wherein the disposition of the first ion exchange material domain 14 or 16 relative to the separator element 24 defines a respective space between the first ion exchange material domain 14 or 16 and the separator element 24, and a second ion exchange material domain is disposed within the ion-concentrating compartment 12, wherein at least a portion of the second ion exchange material domain is also disposed within the respective space. The ion permeable membrane 18 or 20 includes an ion-concentrating compartment side surface 26 or 28 having a surface area, and the first ion exchange material domain 14 or 16 disposed within the ion-concentrating compartment 12 is contiguous with at least a portion of the ion-concentrating compartment side surface 26 or 28 of the ion permeable membrane 18 or 20. The at least a portion of the ion-concentrating compartment side surface 26 or 28 of the ion permeable membrane 18 or 20 defines an operative side surface fraction of the ion-concentrating compartment side surface 26 or 28 of the ion permeable membrane 18 or 20. The operative side surface fraction of the ion-concentrating compartment side surface 26 or 28 of the ion permeable membrane 18 or 20 defines an operative side surface area fraction of the ion-concentrating compartment side surface 26 or 28 of the ion permeable membrane 18 or 20 which is at least 10% of the ion-concentrating compartment side surface area of the ion permeable membrane 18 or 20. For example, with respect to the relative size of the operative side surface area fraction of the ion-concentrating compartment side surface 26 or 28 of the ion permeable membrane 18 or 20, the operative side surface area fraction of the ion-concentrating compartment side surface 26 or 28 of the ion permeable membrane 18 or 20 is at least 50% of the ion-concentrating compartment side surface area of the ion permeable membrane 18 or 20. As a further example, with respect to the relative size of the operative side surface area fraction of the ion-concentrating compartment side surface 26 or 28 of the ion permeable membrane 18 or 20, the operative side surface area fraction of the ion-concentrating compartment side surface 26 or 28 of the ion permeable membrane 18 or 20 is substantially the entire ion-concentrating compartment side surface area of the ion permeable membrane 18 or 20. For example, and referring to FIGS. 24 and 25, with respect to the spatial disposition of the operative side surface fraction of the ion-concentrating compartment side surface 26 or 28 of the ion permeable membrane 18 or 20, the operative side surface fraction of the ion-concentrating compartment side surface 26 or 28 of the ion permeable membrane 18 or 20, in comparison to substantially any remaining fractions of the ion-concentrating compartment side surface 26 or 28 of the ion permeable membrane 18 or 20, is closest to an outlet 367 of an ion-depleting compartment 36 disposed on an opposite side of the ion permeable membrane 18 or 20. Referring to FIGS. 22 and 24, where the ion permeable membrane 18 or 20, having the at least a portion of the ion-concentrating compartment side surface 26 or 28 with which the first ion exchange material domain is contiguous, is an anion permeable membrane 18, the first ion exchange material domain is an anion exchange material predominant domain 14. Referring to FIGS. 23 and 25, where the ion permeable membrane 18 or 20, having the at least a portion of the ion-concentrating compartment side surface 26 or 28 with which the first ion exchange material domain is contiguous, is a cation permeable membrane 20, the first ion exchange material domain is a cation exchange material predominant domain 16. For example, the second ion exchange material domain is contiguous with the first ion exchange material domain. As a further example, where the separator element 24 is a second ion permeable membrane, wherein the separator element 24 is the other one of the one of the anion permeable membrane 18 and the cation permeable membrane 20, the second ion exchange material domain is contiguous with the other one of the one of the anion permeable membrane and the cation permeable membrane. Referring to FIGS. 22 and 24, in the case where the first ion exchange material domain is an anion exchange material predominant domain 14, the second ion exchange material domain is a non-anion exchange material predominant domain 161. For example, the domain 161 includes a mixed ion exchange material domain 22, or the domain 161 is a mixed ion exchange material domain in its entirety. As a further example, the domain 141 includes a cation exchange material predominant domain 16, or the domain 161 is a cation exchange material domain 16 in its entirety. Referring to FIGS. 23 and 25, in the case where the first ion exchange material domain is a cation exchange material predominant domain 16, the second ion exchange material domain is a non-cation exchange material predominant domain 141. For example, the domain 141 includes a mixed ion exchange material domain 22, or the domain 141 is a mixed ion exchange material domain in its entirety. As a further example, the domain 141 includes an anion exchange material predominant domain 14, or the domain 141 is an anion exchange material predominant domain in its entirety. For example, with respect to the separator element 24, the separator element 24 is substantially impermeable, such as where the separator element 24 is an electrode (see FIGS. 26 to 29). As a further example, with respect to the separator element 24, the separator element 24 is a second ion permeable membrane, wherein the second ion permeable membrane is the other one of the one of the anion permeable membrane 18 and the cation permeable membrane 20 (see FIGS. 30 to 35).

With respect to the ion-concentrating compartment 12 partially bounded by an anion permeable membrane 18 and also partially bounded by a separator element 24, and where the separator element 24 is an electrode 25, for example, and referring to FIG. 26, an anion exchange material predominant domain 14 is disposed within the ion-concentrating compartment 12, wherein the disposition of the anion exchange material predominant domain 14 relative to the electrode 25 defines a respective space between the domain 14 and the electrode 25. A mixed ion exchange material domain 22 is disposed within the ion-concentrating compartment, wherein at least a portion of the mixed ion exchange material domain 22 is disposed within the respective space. The anion permeable membrane 18 includes an ion-concentrating compartment side surface 26 defining a surface area, wherein the anion exchange material predominant domain 14 disposed within the ion-concentrating compartment 12 is contiguous with at least a portion of the ion-concentrating compartment side surface 26 of the anion permeable membrane 18. The at least a portion of the ion-concentrating compartment side surface 26 of the anion permeable membrane 18 defines an operative side surface fraction of the ion-concentrating compartment side surface 26 of the anion permeable membrane 18. The operative side surface fraction of the ion-concentrating compartment side surface 26 of the anion permeable membrane 18 defines an operative side surface area fraction of the ion-concentrating compartment side surface 26 of the anion permeable membrane 18 which is at least 10% of the ion-concentrating compartment side surface area of the anion permeable membrane 18. For example, with respect to the relative size of the operative side surface area fraction of the ion-concentrating compartment side surface 26 of the anion permeable membrane 18, the operative side surface area fraction of the ion-concentrating compartment side surface 26 of the anion permeable membrane 18 is at least 50% of the ion-concentrating compartment side surface area of the anion permeable membrane 18. As a further example, with respect to the relative size of the operative side surface area fraction of the ion-concentrating compartment side surface 26 of the anion permeable membrane 18, the operative side surface area fraction of the ion-concentrating compartment side surface 26 of the anion permeable membrane 18 is substantially the entire ion-concentrating compartment side surface area of the anion permeable membrane 18. For example, and referring to FIG. 27, with respect to the spatial disposition of the operative side surface fraction of the ion-concentrating compartment side surface 26 of the anion permeable membrane 18, the operative side surface fraction of the ion-concentrating compartment side surface 26 of the anion permeable membrane 18, in comparison to substantially any remaining fractions of the ion-concentrating compartment side surface 26 of the anion permeable membrane 18, is closest to an outlet 367 of an ion-depleting compartment 36 disposed on an opposite side of the anion permeable membrane 18. For example, the domain 22 is contiguous with the domain 14. For example, this may be the case for the anode compartment 30, where the electrode is an anode 32.

With respect to the ion-concentrating compartment 12 partially bounded by a cation permeable membrane 20 and also partially bounded by a separator element 24, and where the separator element 24 is an electrode 25, for example, and referring to FIG. 28, a cation exchange material predominant domain 16 is disposed within the ion-concentrating compartment 12, wherein the disposition of the cation exchange material predominant domain 16 relative to the electrode 25 defines a respective space between the domain 16 and the electrode 25. A mixed ion exchange material domain 22 is disposed within the ion-concentrating compartment 12, wherein at least a portion of the mixed ion exchange material domain 22 is also disposed within the respective space. The cation permeable membrane 20 includes an ion-concentrating compartment side surface 28 defining a surface area, and the cation exchange material predominant domain 16 disposed within the ion-concentrating compartment 12 is contiguous with at least a portion of the ion-concentrating compartment side surface 28 of the cation permeable membrane 20. The at least a portion of the ion-concentrating compartment side surface 28 of the cation permeable membrane 20 defines an operative side surface fraction of the ion-concentrating compartment side surface 28 of the cation permeable membrane 20. The operative side surface fraction of the ion-concentrating compartment side surface 28 of the cation permeable membrane 20 defines an operative side surface area fraction of the ion-concentrating compartment side surface 28 of the cation permeable membrane 20 which is at least 10% of the ion-concentrating compartment side surface area of the cation permeable membrane 20. For example, with respect to the relative size of the operative side surface area fraction of the ion-concentrating compartment side surface 28 of the cation permeable membrane 20, the operative side surface area fraction of the ion-concentrating compartment side surface 28 of the cation permeable membrane 20 is at least 50% of the ion-concentrating compartment side surface area of the cation permeable membrane 20. As a further example, with respect to the relative size of the operative side surface area fraction of the ion-concentrating compartment side surface 28 of the cation permeable membrane 20, the operative side surface area fraction of the ion-concentrating compartment side surface 28 of the cation permeable membrane 20 is substantially the entire ion-concentrating compartment side surface area of the cation permeable membrane 20. For example, and referring to FIG. 29, with respect to the spatial disposition of the operative side surface fraction of the ion-concentrating compartment side surface 28 of the cation permeable membrane 20, the operative side surface fraction of the ion-concentrating compartment side surface 28 of the cation permeable membrane 20, in comparison to substantially any remaining fractions of the ion-concentrating compartment side surface 28 of the cation permeable membrane 20, is closest to an outlet 367 of an ion-depleting compartment 36 disposed on an opposite side of the cation permeable membrane 20. For example, the domain 22 is contiguous with the domain 16. For example, this may be the case for the cathode compartment 34, where the electrode is an cathode 35.

Figure 30:
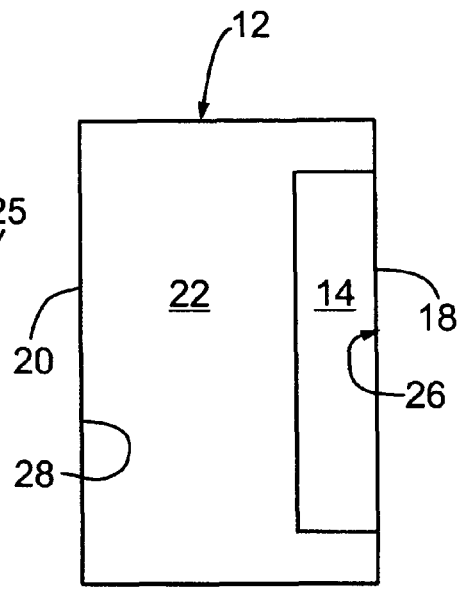
Figure 31:
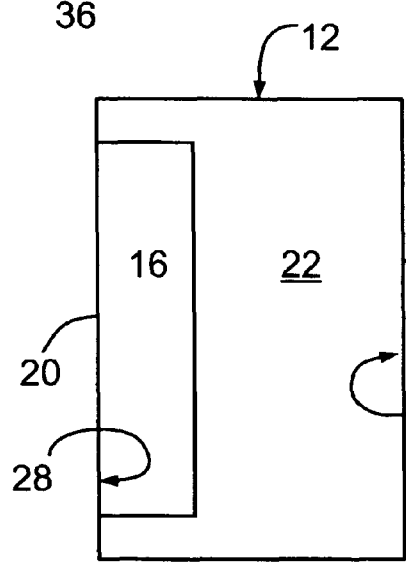
Figure 32:
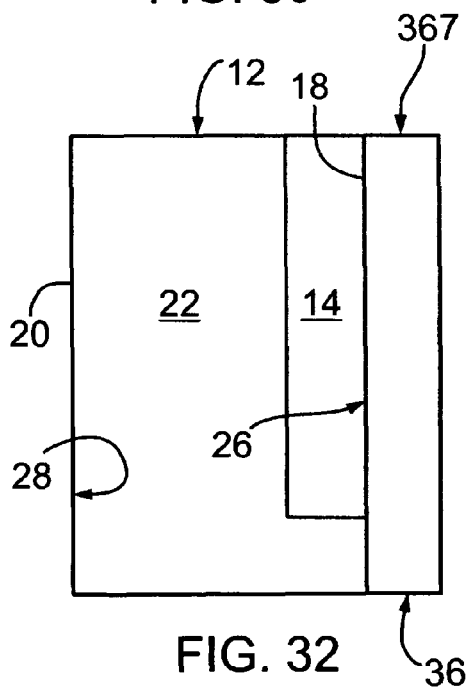
Figure 33:
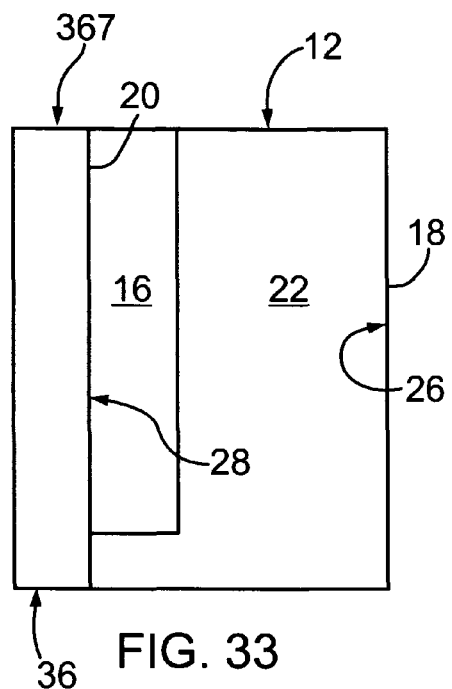

With respect to the ion-concentrating compartment 12 partially bounded by an anion permeable membrane 18 and also partially bounded by a cation permeable membrane 20, for example, and referring to FIGS. 30 and 31, a first ion exchange material domain 14 or 16 is disposed within the ion-concentrating compartment 12 and is contiguous with at least a portion of an ion-concentrating compartment side surface 26 or 28 of one of the anion permeable membrane 18 and the cation permeable membrane 20. A mixed ion exchange material domain 22 is also disposed within the ion-concentrating compartment 12. The disposition the first ion exchange material domain 14 or 16 relative to the other one of the one of the anion permeable membrane 18 and the cation permeable membrane 20 defines a respective space between the first ion exchange material domain 14 or 16 and the other one of the one of the anion permeable membrane 18 or the cation permeable membrane 20. At least a portion of the mixed ion exchange material domain 22 is disposed within the respective space. For example, the domain 22 is contiguous with the first ion exchange material domain 14 or 16. The at least a portion of the ion-concentrating compartment side surface 26 or 28 defines an operative side surface fraction of the ion-concentrating compartment side surface 26 or 28 of the one of the anion permeable membrane 18 and the cation permeable membrane 20. The operative side surface fraction of the ion-concentrating compartment side surface 26 or 28 of the one of the anion permeable membrane 18 and the cation permeable membrane 20 defines an operative side surface area fraction of the ion-concentrating compartment side surface 26 or 28 of the one of the anion permeable membrane 18 and the cation permeable membrane 20 which is at least 10% of the ion-concentrating compartment side surface area of the one of the anion permeable membrane 18 and the cation permeable membrane 20. For example, with respect to the relative size of the operative side surface area fraction of the ion-concentrating compartment side surface 26 or 28 of the one of the anion permeable membrane 18 and the cation permeable membrane 20, the operative side surface area fraction of the ion-concentrating compartment side surface 26 or 28 of the one of the anion permeable membrane 18 and the cation permeable membrane 20 is at least 50% of the ion-concentrating compartment side surface area of the one of the anion permeable membrane 18 and the cation permeable membrane 20. As a further example, with respect to the relative size of the operative side surface area fraction of the ion-concentrating compartment side surface 26 or 28 of the one of the anion permeable membrane 18 and the cation permeable membrane 20, the operative side surface area fraction of the ion-concentrating compartment side surface 26 or 28 of the one of the anion permeable membrane and the cation permeable membrane 20 is substantially the entire ion-concentrating compartment side surface area of the one of the anion permeable membrane 18 and the cation permeable membrane 20. For example, and referring to FIGS. 32 and 33, with respect to the spatial disposition of the operative side surface fraction of the ion-concentrating compartment side surface 26 or 28 of the one of the anion permeable membrane 18 and the cation permeable membrane 20, the operative side surface fraction of the ion-concentrating compartment side surface 26 or 28 of the one of the anion permeable membrane 18 and the cation permeable membrane 20, in comparison to substantially any remaining fractions of the ion-concentrating compartment side surface 26 or 28 of the one of the anion permeable membrane 18 and the cation permeable membrane 20, is closest to an outlet 367 of an ion-depleting compartment 36 disposed on an opposite side of the one of the anion permeable membrane 18 and the cation permeable membrane 20. Referring to FIGS. 30 and 32, where the one of the anion permeable membrane 18 and the cation permeable membrane 20, having the at least a portion of the ion concentrating compartment side surface 26 or 28 with which the first ion exchange material domain is contiguously disposed, is an anion permeable membrane 18, the first ion exchange material domain is an anion exchange material predominant domain 14. Referring to FIGS. 31 and 33, where the one of the anion permeable membrane 18 and the cation permeable membrane 20, having the at least a portion of the ion concentrating compartment side surface 26 or 28 with which the first ion exchange material domain is contiguously disposed, is a cation permeable membrane 20, the first ion exchange material domain is a cation exchange material predominant domain 16.

Figure 34:
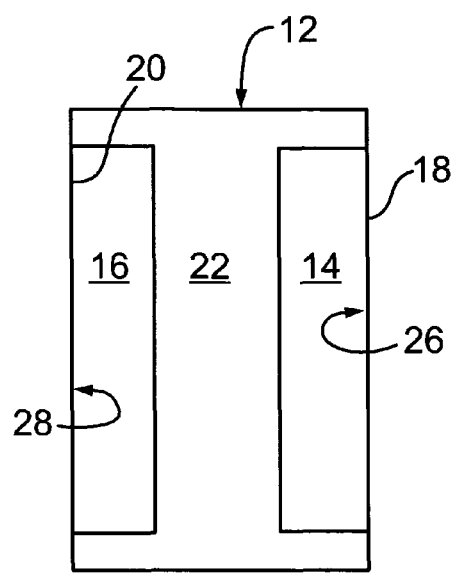
Figure 35:
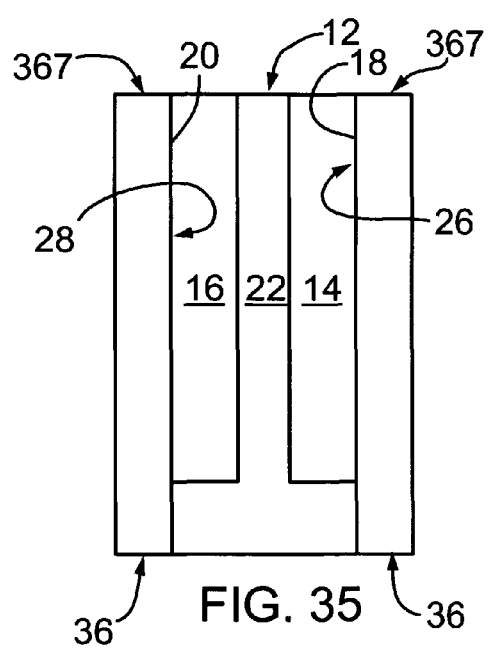

With respect to the ion-concentrating compartment 12 partially bounded by an anion permeable membrane 18 and also partially bounded by a cation permeable membrane 20, for example, and referring to FIG. 34, an anion exchange material predominant domain 14 is disposed within the ion-concentrating compartment 12, a cation exchange material predominant domain 16 is disposed within the ion-concentrating compartment 12, and a mixed ion exchange material domain 22 is disposed within the ion-concentrating compartment 12. The anion exchange material predominant domain 14 is contiguous with at least a portion of the ion-concentrating compartment side surface 26 of the anion permeable membrane 18. The disposition of the anion exchange material predominant domain 14 relative to the cation permeable membrane 20 defines a respective first space between the domain 14 and the cation permeable membrane 20. The at least a portion of the side surface 26 of the anion permeable membrane 18 defines an operative side surface fraction of the ion-concentrating compartment side surface 26 of the anion permeable membrane 18. The operative side surface fraction of the ion-concentrating compartment side surface 26 of the anion permeable membrane 18 defines an operative side surface area fraction of the ion-concentrating compartment side surface 26 of the anion permeable membrane 18 which is at least 10% of the ion-concentrating compartment side surface area of the anion permeable membrane 18. For example, with respect to the relative size of the operative side surface area fraction of the ion-concentrating compartment side surface 26 of the anion permeable membrane 18, the operative side surface area fraction of the ion-concentrating compartment side surface 26 of the anion permeable membrane 18 is at least 50% of the ion-concentrating compartment side surface area of the anion permeable membrane 18. As a further example, with respect to the relative size of the operative side surface area fraction of the ion-concentrating compartment side surface 26 of the anion permeable membrane 18, the operative side surface area fraction of the ion-concentrating compartment side surface 26 of the anion permeable membrane 18 is substantially the entire ion-concentrating compartment side surface area of the anion permeable membrane 18. The cation exchange material predominant domain 16 is contiguous with at least a portion of the ion-concentrating compartment side surface 28 of the cation permeable membrane 20. The disposition of the cation exchange material predominant domain 16 relative to the anion permeable membrane 18 defines a respective second space between the domain 16 and the anion permeable membrane 18. The at least a portion of the side surface 28 of the cation permeable membrane 20 defines an operative side surface fraction of the ion-concentrating compartment side surface 28 of the cation permeable membrane 20. The operative side surface fraction of the ion-concentrating compartment side surface 28 of the cation permeable membrane 20 defines an operative side surface area fraction of the ion-concentrating compartment side surface 28 of the cation permeable membrane 20 which is at least 10% of the ion-concentrating compartment side surface area of the cation permeable membrane 20. For example, with respect to the relative size of the operative side surface area fraction of the ion-concentrating compartment side surface 28 of the cation permeable membrane 20, the operative side surface area fraction of the ion-concentrating compartment side surface 28 of the cation permeable membrane 20 is at least 50% of the ion-concentrating compartment side surface area of the cation permeable membrane 20. As a further example, with respect to the relative size of the operative side surface area fraction of the ion-concentrating compartment side surface 28 of the cation permeable membrane 20, the operative side surface area fraction of the ion-concentrating compartment side surface 28 of the cation permeable membrane 20 is substantially the entire ion-concentrating compartment side surface area of the cation permeable membrane 20. For example, and referring to FIG. 35, with respect to the spatial disposition of the operative side surface fraction of the ion-concentrating compartment side surface 26 of the anion permeable membrane 18, the operative side surface fraction of the ion-concentrating compartment side surface 26 of the anion permeable membrane 18, in comparison to substantially any remaining fractions of the ion-concentrating compartment side surface 26 of the anion permeable membrane 18, is closest to an outlet 367 of an ion-depleting compartment 36 disposed on an opposite side of the anion permeable membrane 18. For example, with respect to the spatial disposition of the operative side surface fraction of the ion-concentrating compartment side surface 28 of the cation permeable membrane 20, the operative side surface fraction of the ion-concentrating compartment side surface 28 of the cation permeable membrane 20, in comparison to substantially any remaining fractions of the ion-concentrating compartment side surface 28 of the cation permeable membrane 20, is closest to an outlet 367 of an ion-depleting compartment 36 disposed on an opposite side of the cation permeable membrane 20. At least a portion of the mixed ion exchange material domain 22 is disposed within at least one of the respective first and second spaces. For example, the domain 22 is contiguous with each of the domains 14 and 16.

Figure 36:
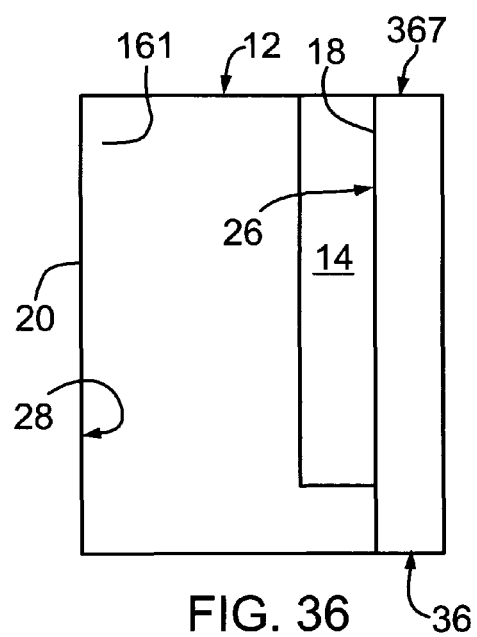

(d) Third Embodiment of EDI Apparatus Having an Ion Concentrating Compartment Containing Ion Exchange Material Referring to FIGS. 36 and 37, in another embodiment, an electrodeionization apparatus 10 is provided including an ion concentrating compartment 12 which is partially bounded by an anion permeable membrane 18 and also partially bounded by a cation permeable membrane 20. The anion permeable membrane 18 includes an ion-concentrating compartment side surface 26 which defines a surface area, and the cation permeable membrane 20 includes an ion-concentrating compartment side surface 28 which defines a surface area. A first ion exchange material domain is disposed within the ion-concentrating compartment 12, wherein the first ion exchange material domain is contiguous with at least a portion of the ion-concentrating compartment side surface 26 or 28 of one of the anion permeable membrane 18 and the cation permeable membrane 20. The at least a portion of the side surface 26 or 28 of the one of the anion permeable membrane 18 and the cation permeable membrane 20 defines an operative side surface fraction of the ion-concentrating compartment side surface 26 or 28 of the one of the anion permeable membrane 18 and the cation permeable membrane 20. The operative side surface fraction of the ion-concentrating compartment side surface 26 or 28 of the one of the anion permeable membrane 18 and the cation permeable membrane 20 defines an operative side surface area fraction of the ion-concentrating compartment side surface 26 or 28 of the one of the anion permeable membrane 18 and the cation permeable membrane 20 which is at least 10% of the ion-concentrating compartment side surface area of the one of the anion permeable membrane 18 or the cation permeable membrane 20. For example, with respect to the relative size of the operative surface fraction of the ion-concentrating compartment side surface 26 or 28 of the one of the anion permeable membrane 18 and the cation permeable membrane 20, the operative side surface area fraction of the ion-concentrating compartment side surface 26 or 28 of the one of the anion permeable membrane 18 and the cation permeable membrane 20 is at least 50% of the ion-concentrating compartment side surface area of the one of the anion permeable membrane 18 and the cation permeable membrane 20. As a further example, with respect to the relative size of the operative side surface area fraction of the ion-concentrating compartment side surface 26 or 28 of the one of the anion permeable membrane 18 and the cation permeable membrane 20, the operative side surface area fraction of the ion-concentrating compartment side surface 26 or 28 of the one of the anion permeable membrane 18 and the cation permeable membrane 20 is substantially the entire ion-concentrating compartment side surface area of the one of the anion permeable membrane 18 and the cation permeable membrane 20. The operative side surface fraction of the ion-concentrating compartment 26 or 28 side surface of the one of the anion permeable membrane 18 and the cation permeable membrane 20, in comparison to substantially any remaining fractions of the ion-concentrating compartment side surface 26 or 28 of the one of the anion permeable membrane 18 and the cation permeable membrane 20, is closest to an outlet 367 of an ion-depleting compartment 36 disposed on an opposite side of the one of the anion permeable membrane 18 and the cation permeable membrane 20. The first ion exchange material domain is also spaced apart from at least a portion of the ion-concentrating compartment side surface 26 or 28 of the other one of the one of the anion permeable membrane 18 and the cation permeable membrane 20. The at least a portion of the ion-concentrating compartment side surface 26 or 28 of the other one of the one of the anion permeable membrane 18 and the cation permeable membrane 20 defines an operative side surface fraction of the ion-concentrating compartment side surface 26 or 28 of the other one of the one of the anion permeable membrane 18 and the cation permeable membrane 20. The operative side surface fraction of the ion-concentrating compartment side surface 26 or 28 of the other one of the one of the anion permeable membrane 18 and the cation permeable membrane 20 defines an operative side surface area fraction of the ion-concentrating compartment side surface 26 or 28 of the other one of the one of the anion permeable membrane 18 and the cation permeable membrane 20 which is at least 10% of the ion-concentrating compartment side surface area of the ion-concentrating compartment side surface 26 or 28 of the other one of the one of the anion permeable membrane 18 and the cation permeable membrane 20. For example, with respect to the relative size of the operative surface fraction of the ion-concentrating compartment side surface 26 or 28 of the other one of the one of the anion permeable membrane 18 and the cation permeable membrane 20, the operative side surface area fraction of the ion-concentrating compartment side surface 26 or 28 of the other one of the one of the anion permeable membrane 18 and the cation permeable membrane 20 is at least 50% of the ion-concentrating compartment side surface area of the other one of the one of the anion permeable membrane 18 and the cation permeable membrane 20. As a further example, with respect to the relative size of the operative side surface area fraction of the ion-concentrating compartment side surface 26 or 28 of the other one of the one of the anion permeable membrane 18 and the cation permeable membrane 20, the operative side surface area fraction of the ion-concentrating compartment side surface 26 or 28 of the other one of the one of the anion permeable membrane 18 and the cation permeable membrane 20 is substantially the entire ion-concentrating compartment side surface area of the other one of the one of the anion permeable membrane 18 and the cation permeable membrane 20. The operative side surface fraction of the ion-concentrating compartment side surface 26 or 28 of the other one of the one of the anion permeable membrane 18 and the cation permeable membrane 20, in comparison to substantially any remaining portions of the ion-concentrating compartment side surface 26 or 28 of the other one of the one of the anion permeable membrane 18 and the cation permeable membrane 20, is closest to an outlet 367 of an ion-depleting compartment 36 disposed on an opposite side of the other one of the one of the anion permeable membrane 18 and the cation permeable membrane 20.

Referring to FIG. 36, in the case where the one of the anion permeable membrane 18 and the cation permeable membrane 20, having the at least a portion of the ion-concentrating compartment side surface with which the first ion exchange material domain is contiguous, is the anion permeable membrane 18, the first ion exchange material domain is an anion exchange material predominant domain 14. The first ion exchange material domain (i.e. the anion exchange material predominant domain 14) is contiguous with at least a portion of the ion-concentrating compartment side surface 26 of the anion permeable membrane 18. The at least a portion of the side surface 26 of the anion permeable membrane 18 defines a first operative side surface fraction of the ion-concentrating compartment side surface 26 of the anion permeable membrane 18. The first operative side surface fraction of the ion-concentrating compartment side surface 26 of the anion permeable membrane 18 defines a first operative side surface area fraction of the ion-concentrating compartment side surface 26 of the anion permeable membrane 18 which is at least 10% of the ion-concentrating compartment side surface area of the anion permeable membrane 18. For example, with respect to the relative size of the first operative side surface area fraction of the ion-concentrating compartment side surface 26 of the anion permeable membrane 18, the first operative side surface area fraction of the ion-concentrating compartment side surface 26 of the anion permeable membrane 18 is at least 50% of the ion-concentrating compartment side surface area of the anion permeable membrane 18. As a further example, with respect to the relative size of the first operative side surface area fraction of the ion-concentrating compartment side surface 26 of the anion permeable membrane 18, the first operative side surface area fraction of the ion-concentrating compartment side surface 26 of the anion permeable membrane 18 is substantially the entire ion-concentrating compartment side surface area of the anion permeable membrane 18. The first operative side surface fraction of the ion-concentrating compartment side surface 26 of the anion permeable membrane 18, in comparison to substantially any remaining fractions of the ion-concentrating compartment side surface 26 of the anion permeable membrane 18, is closest to an outlet 367 of an ion-depleting compartment 36 disposed on an opposite side of the anion permeable membrane 18. The first ion exchange material domain (i.e. the anion exchange material predominant domain 14) is also spaced apart from at least a portion of the ion-concentrating compartment side surface 28 of the cation permeable membrane 20. The at least a portion of the ion-concentrating compartment side surface 28 of the cation permeable 20 defines a first operative side surface fraction of the ion-concentrating compartment side surface 28 of the cation permeable membrane 20. The first operative side surface fraction of the ion-concentrating compartment side surface 28 of the cation permeable membrane 20 defines a first operative side surface area fraction of the ion-concentrating compartment side surface 28 of the cation permeable membrane 20 which is at least 10% of the ion-concentrating compartment side surface area of the ion-concentrating compartment side surface 28 of the cation permeable membrane 20. For example, with respect to the relative size of the first operative side surface area fraction of the ion-concentrating compartment side surface 28 of the cation permeable membrane 20, the first operative side surface area fraction of the ion-concentrating compartment side surface 28 of the cation permeable membrane 20 is at least 50% of the ion-concentrating compartment side surface area of the cation permeable membrane 20. As a further example, with respect to the relative size of the first operative side surface area fraction of the ion-concentrating compartment side surface 28 of the cation permeable membrane 20, the first operative side surface area fraction of the ion-concentrating compartment side surface 28 of the cation permeable membrane 20 is substantially the entire ion-concentrating compartment side surface area of the cation permeable membrane 20. The first operative side surface fraction of the ion-concentrating compartment side surface 28 of the cation permeable membrane 20, in comparison to substantially any remaining fractions of the ion-concentrating compartment side surface 28 of the cation permeable membrane 20, is closest to an outlet 367 of an ion-depleting compartment 36 disposed on an opposite side of the cation permeable membrane 20.

Referring to FIG. 37, in the case where the one of the anion permeable membrane 18 and the cation permeable membrane 20, having the at least a portion of the ion-concentrating compartment side surface with which the first ion exchange material domain is contiguous, is the cation permeable membrane 20, the first ion exchange material domain is a cation exchange material predominant domain 16. The first ion exchange material domain (i.e. the cation exchange material predominant domain 16) is contiguous with at least a portion of the ion-concentrating compartment side surface 28 of the cation permeable membrane 20. The at least a portion of the side surface 28 of the cation permeable membrane 20 defines a second operative side surface fraction of the ion-concentrating compartment side surface 28 of the cation permeable membrane 20. The second operative side surface fraction of the ion-concentrating compartment side surface 28 of the cation permeable membrane 20 defines a second operative side surface area fraction of the ion-concentrating compartment side surface 28 of the cation permeable membrane 20 which is at least 10% of the ion-concentrating compartment side surface area of the cation permeable membrane 20. For example, with respect to the relative size of the second operative side surface area fraction of the ion-concentrating compartment side surface 28 of the cation permeable membrane 20, the second operative side surface area fraction of the ion-concentrating compartment side surface 28 of the cation permeable membrane 20 is at least 50% of the ion-concentrating compartment side surface area of the cation permeable membrane 20. As a further example, with respect to the relative size of the second operative side surface area fraction of the ion-concentrating compartment side surface 28 of the cation permeable membrane 20, the second operative side surface area fraction of the ion-concentrating compartment side surface 28 of the cation permeable membrane 20 is substantially the entire ion-concentrating compartment side surface area of the cation permeable membrane 20. The second operative side surface fraction of the ion-concentrating compartment side surface 28 of the cation permeable membrane 20, in comparison to substantially any remaining fractions of the ion-concentrating compartment side surface 28 of the cation permeable membrane 20, is closest to an outlet 367 of an ion-depleting compartment 36 disposed on an opposite side of the cation permeable membrane 20. The first ion exchange material domain (i.e. the cation exchange material predominant domain 16) is also spaced apart from at least a portion of the ion-concentrating compartment side surface 26 of the anion permeable membrane 18. The at least a portion of the ion-concentrating compartment side surface 26 of the anion permeable membrane 18 defines a second operative side surface fraction of the ion-concentrating compartment side surface 26 of the anion permeable membrane 18. The second operative side surface fraction of the ion-concentrating compartment side surface 26 of the anion permeable membrane 18 defines a second operative side surface area fraction of the ion-concentrating compartment side surface 26 of the anion permeable membrane 18 which is at least 10% of the ion-concentrating compartment side surface area of the ion-concentrating compartment side surface 26 of the anion permeable membrane 18. For example, with respect to the relative size of the second operative side surface area fraction of the ion-concentrating compartment side surface 26 of the anion permeable membrane 18, the second operative side surface area fraction of the ion-concentrating compartment side surface 26 of the anion permeable membrane 18 is at least 50% of the ion-concentrating compartment side surface area of the anion permeable membrane 18. As a further example, with respect to the relative size of the second operative side surface area fraction of the ion-concentrating compartment side surface 26 of the anion permeable membrane 18, the second operative side surface area fraction of the ion-concentrating compartment side surface 26 of the anion permeable membrane 18 is substantially the entire ion-concentrating compartment side surface area of the anion permeable membrane 18. The second operative side surface fraction of the ion-concentrating compartment side surface 26 of the anion permeable membrane 18, in comparison to substantially any remaining fractions of the ion-concentrating compartment side surface 26 of the anion permeable membrane 18, is closest to an outlet 367 of an ion-depleting compartment 36 disposed on an opposite side of the anion permeable membrane 18.

In this embodiment, the first ion exchange material domain 14 or 16 is not required to be spaced apart from the ion-concentrating compartment side surface of the other one of the one of the anion permeable membrane 18 and the cation permeable membrane 20. In this respect, for example, and referring to FIG. 43, an ion concentrating compartment 12 is provided and is partially bounded by an anion permeable membrane 18 and is also partially bounded by a cation permeable membrane 20. The first ion exchange material domain is a cation exchange material predominant domain 16 disposed within the ion-concentrating compartment 12. The cation exchange predominant domain material 16 is contiguous with an operative side surface fraction 28a of an ion-concentrating compartment side surface 28 of the cation permeable membrane 20, wherein the operative side surface fraction of the ion-concentrating compartment side surface 28 defines an operative side surface area fraction of the ion-concentrating compartment side surface 28 of the cation permeable membrane 20 which is at least 10% of the ion-concentrating compartment side surface area of the cation permeable membrane. The operative side surface fraction of the ion-concentrating compartment side surface 28 of the cation permeable membrane 20, in comparison to substantially any remaining fractions of the ion-concentrating compartment side surface 28 of the cation permeable membrane 20, is closest to an outlet 367 of an ion-depleting compartment 36 disposed on an opposite side of the cation permeable membrane 20. The cation exchange material predominant domain 16 is also spaced apart from at least a portion 26a of the ion-concentrating compartment side surface 26 of the anion permeable membrane 18, wherein the at least a portion defines an operative side surface fraction of the ion-concentrating compartment side surface of the anion permeable membrane 18. The operative side surface fraction of the ion-concentrating compartment side surface 26 of the anion permeable membrane 18 defines an operative side surface area fraction of the ion-concentrating compartment side surface 26 of the anion permeable membrane 18 which is at least 10% of the ion-concentrating compartment side surface area of the ion-concentrating compartment side surface 26 of the anion permeable membrane 18. The operative side surface fraction of the ion-concentrating compartment side surface 26 of the anion permeable membrane 18, in comparison to substantially any remaining fractions of the ion-concentrating compartment side surface 26 of the anion permeable membrane 18, is closest to an outlet 367 of an ion-depleting compartment 36 disposed on an opposite side of the anion permeable membrane 18. Notably, the cation exchange material predominant domain 16 is also contiguous with a portion 26b of the ion-concentrating compartment side surface 26 of the anion permeable membrane 18 which is relatively remote from the outlet 367 of an ion-depleting compartment 36 disposed on an opposite side of the anion permeable membrane 18.

For example, the electrodeionization apparatus further comprises a second ion exchange material domain disposed within the ion-concentrating compartment 12. The second ion exchange material domain is contiguous with the at least a portion of the ion-concentrating compartment side surface of the other one of the one of the anion permeable membrane 18 and the cation permeable membrane 20 (i.e. that portion from which the first ion exchange material domain is spaced apart). For example, the second ion exchange material domain is also contiguous with the first ion exchange material domain.

In the case where the first ion exchange material domain is an anion exchange material predominant domain 14 (see FIG. 36), the second ion exchange material domain is a non-anion exchange material predominant domain 161. For example, the second ion exchange material domain includes a mixed ion exchange material domain 22, or the second ion exchange material domain is a mixed ion exchange material domain 22 in its entirety. As a further example, the second ion exchange material domain includes a cation exchange material predominant domain 16, or the second ion exchange material domain is a cation exchange material predominant domain 16 in its entirety.

In the case where the first ion exchange material domain is a cation exchange material predominant domain 16 (see FIG. 37), the second ion exchange material domain is a non-cation exchange material predominant domain 141. For example, the second ion exchange material domain includes a mixed ion exchange material domain 22, or the second ion exchange material domain is a mixed ion exchange material domain in its entirety. As a further example, the second ion exchange material domain includes an anion exchange material predominant domain 14, or the second ion exchange material domain is an anion material predominant domain 14 in its entirety.

For example, and referring to FIGS. 38 and 39, a mixed ion exchange material domain 22 is further disposed within the ion-concentrating compartment 12. The disposition of the first ion exchange material domain 14 or 16 relative to the respective other one of the one of the anion permeable membrane 18 and the cation permeable membrane 20 defines a respective space between the first ion exchange material domain 14 or 16 and the respective other one of the one of the membranes 18 or 20. At least a portion of the mixed ion exchange material domain 22 is disposed within the respective space. For example, the domain 22 is contiguous with the first ion exchange material domain 14 or 16.

As a further example, and referring to FIG. 40, there is provided an electrodeionization apparatus 10 including an ion concentrating compartment 12 which is partially bounded by an anion permeable membrane 18 and also partially bounded by a cation permeable membrane 20. The anion permeable membrane 18 includes an ion-concentrating compartment side surface 26 which defines a surface area, and the cation permeable membrane 20 includes an ion-concentrating compartment side surface 28 which defines a surface area. An anion exchange material predominant domain 14 is disposed within the compartment 12 and is contiguous with at least a portion of the ion-concentrating compartment side surface of the anion permeable membrane. The at least a portion of the ion-concentrating compartment side surface 26 of the anion permeable membrane 18 defines an operative side surface fraction of the ion-concentrating compartment side surface 26 of the anion permeable membrane 18. The operative side surface fraction of the ion-concentrating compartment side surface 26 of the anion permeable membrane 18 defines an operative side surface area fraction of the ion-concentrating compartment side surface 26 of the anion permeable membrane 18 which is at least 10% of the ion-concentrating compartment side surface area of the ion-concentrating compartment side surface 26 of the anion permeable membrane 18. For example, with respect to the relative size of the operative side surface area fraction of the ion-concentrating compartment side surface 26 of the anion permeable membrane 18, the operative side surface area fraction of the ion-concentrating compartment side surface 26 of the anion permeable membrane 18 is at least 50% of the ion-concentrating compartment side surface area of the anion permeable membrane 18. As a further example, with respect to the relative size of the operative side surface area fraction of the ion-concentrating compartment side surface 26 of the anion permeable membrane 18, the operative side surface area fraction of the ion-concentrating compartment side surface 26 of the anion permeable membrane 18 is substantially the entire ion-concentrating compartment side surface area of the anion permeable membrane 18. The operative side surface fraction of the ion-concentrating compartment side surface 26 of the anion permeable membrane 18, in comparison to substantially any remaining fractions of the ion-concentrating compartment side surface 26 of the anion permeable membrane 18, is closest to an outlet 367 of an ion-depleting compartment 36 disposed on an opposite side of the anion permeable membrane 18. A cation exchange material predominant domain 16 is also disposed within the compartment 12 and is contiguous with at least a portion of the ion-concentrating compartment side surface 28 of the cation permeable membrane 20. An operative side surface fraction of the ion-concentrating compartment side surface 28 of the cation permeable membrane 20 is defined by the at least a portion of the ion-concentrating compartment surface 28 of the cation permeable membrane 20. The operative side surface fraction of the ion-concentrating compartment side surface 28 of the cation permeable membrane 20 defines an operative side surface area fraction of the ion-concentrating compartment side surface 28 of the cation permeable membrane 20 which is at least 10% of the ion-concentrating compartment side surface area of the cation permeable membrane 20. For example, with respect to the relative size of the operative side surface area fraction of the ion-concentrating compartment side surface 28 of the cation permeable membrane 20, the operative side surface area fraction of the ion-concentrating compartment side surface 28 of the cation permeable membrane 20 is at least 50% of the ion-concentrating compartment side surface area of the cation permeable membrane 20. As a further example, with respect to the relative size of the operative side surface area fraction of the ion-concentrating compartment side surface 28 of the cation permeable membrane 20, the operative side surface area fraction of the ion-concentrating compartment side surface 28 of the cation permeable membrane 20 is substantially the entire ion-concentrating compartment side surface area of the cation permeable membrane 20. The operative side surface fraction of the ion-concentrating compartment side surface 28 of the cation permeable membrane 20, in comparison to substantially any remaining fractions of the ion-concentrating compartment side surface 28 of the cation permeable membrane 20, is closest to an outlet 367 of an ion-depleting compartment 36 disposed on an opposite side of the cation permeable membrane 20. For example, the domain 14 is contiguous with the domain 16.

For example, as a variation of the FIG. 40 embodiment, and referring to FIG. 41, a mixed ion exchange material domain 22 is disposed within the ion-concentrating compartment. The disposition of the anion exchange material predominant domain 14 relative to the cation permeable membrane 20 defines a respective first space between the domain 14 and the cation permeable membrane 20. The disposition of the cation exchange material predominant domain 16 relative to the anion permeable membrane 18 defines a respective second space between the domain 16 and the anion permeable membrane 18. At least a portion of the mixed ion exchange material domain 22 is disposed within at least one of the respective first and second spaces. For example, the mixed ion exchange material domain 22 is contiguous with each of the domains 14 and 16.

For example, and referring to FIG. 42, there is provided an electrodeionization apparatus 10 including an ion concentrating compartment 12 which is partially bounded by an anion permeable membrane 18 and also partially bounded by a cation permeable membrane 20. The anion permeable membrane 18 includes an ion-concentrating compartment side surface 26 which defines a surface area, and the cation permeable membrane 20 includes an ion-concentrating compartment side surface 28 which defines a surface area. An anion exchange material predominant domain 14 is disposed within the compartment 12 and is contiguous with substantially the entire ion-concentrating compartment side surface area of the anion permeable membrane 18. As a necessary incident, the ion-concentrating compartment side surface 26 of the anion permeable membrane 18 with which the domain 14 is contiguous, in comparison to substantially any remaining fractions of the ion-concentrating compartment side surface 26 of the anion permeable membrane 18, is closest to an outlet 367 of an ion-depleting compartment 36 disposed on an opposite side of the anion permeable membrane 18. A cation exchange material predominant domain 16 is disposed within the compartment 12 and is contiguous with substantially the entire ion-concentrating compartment side surface area of the cation permeable membrane 20. As a necessary incident, the ion-concentrating compartment side surface 28 of the cation permeable membrane 20 with which the domain 16 is contiguous, in comparison to substantially any remaining fractions of the ion-concentrating compartment side surface 28 of the cation permeable membrane 20, is closest to an outlet 367 of an ion-depleting compartment 36 disposed on an opposite side of the cation permeable membrane 20. A mixed ion exchange material domain 22 is disposed within the compartment 12 and between each of the anion exchange material predominant domain 14 and the cation exchange material predominant domain 16. The domain 22 is also contiguous with each of the domains 14 and 16, and extends across the length of the compartment 12 (from the inlet end to the outlet end). The ion-concentrating compartment has the shape of a substantially rectangular parallelepiped with a thickness of 3 mm. The domain 14 has a thickness 145 of about 0.2 millimeters, across the entire domain 14. The domain 16 has a thickness 181 of about 0.2 millimeters, across the entire domain 16. The domain 22 has a thickness 221 of about 2.6 millimeters, across the entire domain 22. In this respect, the thickness of each of the domains 14 and 16 is kept at a minimum (e.g. one or two particle diameters, where the ion exchange material is provided in the form of particles), and the thickness of the domain 22 is maximized.

(e) Operation

In operation, an electric potential difference is applied between the anode 32 and the cathode 36. Current passes through the ion-depleting compartments 36 and the ion-concentrating compartments 12, providing for transport of ions and water-splitting in the ion-depleting compartments 36. Anions and cations are transported from ion-depleting compartments 36, across ion permeable membranes 18, 20, to adjacent ion-concentrating compartments 12 (and, in some cases, adjacent electrode compartments 30, 34), resulting in ion depletion of liquid being flowed through the ion-depleting compartments 36. As a result, liquid being flowed through the ion-depleting compartments 36 is deionized to produce the purified liquid flow 365, while liquid being flowed through the ion-concentrating compartments 12 becomes more concentrated in ionic species to produce the concentrated effluent 123. In the example illustrated in FIG. 45, the liquid flows through the compartment 12, 36 are counter-current relative to one another.

It is believed that the cation exchange material predominant domain 16 contiguous with the cation permeable membrane 20 contributes to the reduction in the uncharged weak acid concentration at the membrane surface and thus a reduction in the back diffusion of uncharged weak acid species. In particular, by providing a cation exchange material predominant domain 16 contiguous with the cation permeable membrane 20, the tendency for uncharged weak acid species (such as $CO_2$ or $CH_3COOH$) to transport from the ion-concentrating compartment 12 and to the ion-depleting compartment 36 by diffusion through a cation permeable membrane 20, resulting in ionization of the uncharged weak acid species in the ion-depleting compartment 36 with a concomitant reduction in quality of product water discharging from the ion-depleting compartment 36, is reduced. It is believed that the presence of the cation exchange material predominant domain 16 contributes to this reduction in back diffusion by enabling either or both of the following mechanisms: (i) increasing the diffusion length for weak acids to transport to the cation permeable membrane 20 from within the ion-concentrating compartment 12 (and thereafter permeate through the cation permeable membrane 20 and into the ion-depleting compartment 36), and (ii) decreasing the local concentration of weak acids in the vicinity of the surface of the cation permeable membrane 20 by moving the anion exchange material/cation exchange material interface away from the cation permeable membrane 20 so that weak acids produced at this interface are produced further remotely from the cation permeable membrane 20 where the linear velocity of liquid flowing through the ion-concentrating compartment 12 is higher (relative to the linear velocity of liquid flowing adjacent to the cation permeable membrane 20).

Similarly, it is believed that the anion exchange material predominant domain 14 contiguous with the anion permeable membrane 18 contributes to the reduction in the back diffusion of weak basic substances, such as ammonia and nitrogen containing weak organic bases (such as aniline, butylamine, hydrazine, ethylamine, and hydroxylamine).

In conjunction with the instance of the cation exchange material predominant domain 16 contiguous with the cation permeable membrane 20, and/or the instance of the anion exchange material predominant domain 14 contiguous with the anion permeable membrane 18, the mixed ion exchange material domain 22 is provided to mitigate hardness scale formation within the ion-concentrating compartment 12. Increasing the number of interfaces between anion exchange material and cation exchange material within the ion-concentrating compartment 12 reduces the instances of local concentrations of hardness and scale forming anions. The number of such interfaces is optimized in a mixed ion exchange material domain 22, as opposed to a primarily single phase ion exchange material domain, such as either of the domains 14 or 16. Accordingly, providing mixed ion exchange material domain 22 in addition to one or both of the above-described domains 14, 16, mitigates hardness scale formation which may otherwise pervade if only one or both of the above-described domains 14, 16 is provided in the ion-concentrating compartments 12 without a mixed ion exchange domain 22.

Embodiments of the present invention will be described in further detail with reference to the following non-limitative examples.

(f) Examples

Electrodeionization processes have been carried out to compare: (i) the performance of an electrodeionization apparatus whose ion-concentrating compartment is filled only with mixed ion exchange material, with (ii) the performance of an electrodeionization apparatus whose ion-concentrating compartment includes a cation exchange material domain contiguous with the cation permeable membrane and a mixed ion exchange material domain disposed between the cation exchange material domain and the anion permeable membrane.

Example No. 1

A first electrodeionization apparatus has been provided, including an anode compartment containing an anode and a cathode compartment containing a cathode. A plurality of anion permeable membranes and cation permeable membranes are alternately arranged between the anode compartment and the cathode compartment to form alternating ion-depleting compartments and ion-concentrating compartments, such that there is a total of sixteen (16) ion-concentrating compartment and a total of fifteen (15) ion-depleting compartments. Each of the ion-depleting compartments 36 is bounded by an anion permeable membrane 18 on the anode side and by a cation permeable membrane 20 on the cathode side. Each of the ion-concentrating compartments 12 is bounded by a cation permeable membrane 20 on the anode side and by an anion permeable membrane 18 on the cathode side. Each of the ion-concentrating compartments and the ion-depleting compartments has the shape of a substantially rectangular parallelepiped. The dimension of each of the ion-concentrating compartments is 13 cm×39 cm×0.2 cm (width× length×thickness). The dimension of each of the ion-depleting compartments is 13 cm×39 cm×0.8 cm (width×length× thickness).

Each of the ion-depleting compartments is filled with mixed ion exchange material which is a mixture of Mitsubishi DIAION SK-1B™ resin beads (cation exchange material) and Mitsubishi DIAION SA10A™ resin beads (anion exchange material) in a volumetric ratio of 1:1. The mixed ion exchange material domain within each of the ion-depleting compartments conforms to the shape of the ion-depleting compartments, such that the thickness of the mixed ion exchange material domain is 0.8 cm.

Each of the ion-concentrating compartments is filled with ion-exchange materials so as to form two distinct domains of ion exchange materials. In particular, each of the ion-concentrating compartments includes a cation exchange material domain and a mixed ion exchange material domain. The cation exchange material predominant domain of the ion-concentrating compartment contains Mitsubishi DIAION SK-1B™ resin beads (cation exchange material) which have been sieved to remove larger resin beads such that the size range of the cation exchange material resin bead diameters used in the cation exchange material predominant domain of the ion-concentrating compartment is from 0.42 mm to 0.6 mm. The mixed ion exchange material domain of the ion-concentrating compartment contains mixed ion exchange material which is a mixture of Mitsubishi DIAION SK-1B™ resin beads (cation exchange material) and Mitsubishi DIAION SA10A™ resin beads (anion exchange material) in a volumetric ratio of 1:1. The cation exchange material domain of the ion-concentrating compartment is defined in the shape of a substantially rectangular parallelepiped and is contiguous with substantially the entire ion-concentrating compartment surface of the cation permeable membrane. The mixed ion exchange material domain of the ion-concentrating compartment is defined in the shape of a substantially rectangular parallelepiped and is disposed in the entire space between the cation exchange material domain and the anion permeable membrane. The thickness of the cation exchange material domain is 0.08 cm. The thickness of the mixed ion exchange material domain is 0.12 cm.

The feed flow to each of the ion-depleting compartments, the ion-concentrating compartments, and the electrode compartments has the same composition. Such feed flow is substantially ultrapure water (municipal water which has been pretreated by reverse osmosis) containing dissolved $HCO_3^-$ at a concentration of 15.9 ppm after sodium bicarbonate injection. Product water discharges from each of the ion-depleting compartments at a rate of about 0.4167 gpm. Water discharges from each of the ion-concentrating compartments at a rate of about 0.0235 gpm. Water discharges from the combined electrode compartments at a rate of about 0.25 gpm. Recovery is measured to be 90%. Upon establishing the flows through each of the ion-depleting compartments and the ion-concentrating compartments, an electric current of 3 coulombs/second has been impressed through the external circuit connected to the device, and thus effecting electrodeionization of the aqueous feed flowing through the ion-depleting compartments.

At steady state, the resistivity of the product water discharging from the outlet of the ion-depleting compartments has been measured to be 17.7 Mohm.cm.

Comparative Example No. 1

A comparative example has been carried out using substantially the same electrodeionization apparatus described in Example No. 1, under substantially the same operating conditions, with the exception that each of the ion-concentrating compartments is filled with mixed ion exchange material only (i.e. a mixture of Mitsubishi SK-1B™ resin beads (cation exchange material) and Mitsubishi SA10A™ resin beads (anion exchange material) in a volumetric ratio of 1:1).

At steady state, the resistivity of the product water discharging from the outlet of the ion-depleting compartments, under these conditions, has been measured to be 12 Mohm.cm.

It will be understood, of course, that modifications can be made in the embodiments of the invention described herein without departing from the scope and purview of the invention as defined by the appended claims.

The invention claimed is:

1. An electrodeionization apparatus comprising:
an ion-concentrating compartment partially bounded by an anion permeable membrane and also partially bounded by a cation permeable membrane, wherein the anion permeable membrane includes an ion-concentrating compartment side surface which defines an ion-concentrating compartment side surface area of the anion permeable membrane, and wherein the cation permeable membrane includes an ion-concentrating compartment side surface which defines an ion-concentrating compartment side surface area of the cation permeable membrane;
a first ion exchange material domain within the ion-concentrating compartment, wherein the first ion exchange material domain is contiguous with at least a portion of the ion-concentrating compartment side surface of one of the anion permeable membrane and the cation permeable membrane, wherein the at least a portion of the ion-concentrating compartment side surface of the one of the anion permeable membrane and the cation permeable membrane defines an operative side surface fraction of the ion-concentrating compartment side surface of the one of the anion permeable membrane and the cation permeable membrane, and wherein the operative side surface fraction of the ion-concentrating compartment side surface of the one of the anion permeable membrane and the cation permeable membrane defines an operative side surface area fraction of the ion-concentrating compartment side surface of the one of the anion permeable membrane and the cation permeable membrane which is at least 10% of the ion-concentrating compartment side surface area of the one of the anion permeable membrane and the cation permeable membrane, and wherein the operative side surface fraction of the ion-concentrating compartment side surface of the one of the anion permeable membrane and the cation permeable membrane, in comparison to substantially any remaining fractions of the ion-concentrating compartment side surface of the one of the anion permeable membrane and the cation permeable membrane, is closest to an outlet of an ion-depleting compartment disposed on an opposite side of the one of the anion permeable membrane and the cation permeable membrane, and wherein the first ion exchange material domain is spaced apart from at least a portion of the ion-concentrating compartment side surface of the other one of the one of the anion permeable membrane and the cation permeable membrane, and wherein the at least a portion of the ion-concentrating compartment side surface of the other one of the one of the anion permeable membrane and the cation permeable membrane defines an operative side surface fraction of the other one of the one of the anion permeable membrane and the cation permeable membrane, and wherein the operative side surface fraction of the ion-concentrating compartment side surface of the other one of the one of the anion permeable membrane and the cation permeable membrane defines an operative side surface area fraction of the ion-concentrating compartment side surface of the other one of the one of the anion permeable membrane and the cation permeable membrane which is at least 10% of the ion-concentrating compartment side surface area of the other one of the one of the anion permeable membrane and the cation permeable membrane, and wherein the operative side surface fraction of the ion-concentrating compartment side surface of the other one of the one of the anion permeable membrane and the cation permeable membrane, in comparison to substantially any remaining portions of the ion-concentrating compartment side surface of the other one of the one of the anion permeable membrane and the cation permeable membrane, is closest to an outlet of an ion-depleting compartment disposed on an opposite side of the other one of the one of the anion permeable membrane and the cation permeable membrane;

such that, in the case where the one of the anion permeable membrane and the cation permeable membrane, having the at least a portion of the ion-concentrating compartment side surface with which the first ion exchange material domain is contiguous, is the anion permeable membrane, the first ion exchange material domain is an anion exchange material predominant domain, and wherein the anion exchange material predominant domain is contiguous with at least a portion of the ion-concentrating compartment side surface of the anion permeable membrane, and wherein the at least a portion of the ion-concentrating compartment side surface of the anion permeable membrane defines a first operative side surface fraction of the ion-concentrating compartment side surface of the anion permeable membrane, and wherein the first operative side surface fraction of the ion-concentrating compartment side surface of the anion permeable membrane defines a first operative side surface area fraction of the ion-concentrating compartment side surface of the anion permeable membrane which is at least 10% of the ion-concentrating compartment side surface area of the anion permeable membrane, and wherein the first operative side surface fraction of the ion-concentrating compartment side surface of the anion permeable membrane, in comparison to substantially any remaining fractions of the ion-concentrating compartment side surface of the anion permeable membrane, is closest to an outlet of an ion-depleting compartment disposed on an opposite side of the anion permeable membrane, and wherein the anion exchange material predominant domain is spaced apart from at least a portion of the ion-concentrating compartment side surface of the cation permeable membrane, and wherein the at least a portion of the ion-concentrating compartment side surface of the cation permeable membrane defines a first operative side surface fraction of the ion-concentrating compartment side surface of the cation permeable membrane, and wherein the first operative side surface fraction of the ion-concentrating compartment side surface of the cation permeable membrane defines a first operative side surface area fraction of the ion-concentrating compartment side surface of the cation permeable membrane which is at least 10% of the ion-concentrating compartment side surface area of the cation permeable membrane, and wherein the first operative side surface fraction of the ion-concentrating compartment side surface of the cation permeable membrane, in comparison to substantially any remaining fractions of the ion-concentrating compartment side surface of the cation permeable membrane, is closest to an outlet of an ion-depleting compartment disposed on an opposite side of the cation permeable membrane; and in the case where the one of the anion permeable membrane and the cation permeable membrane, having the at least a portion of the ion-concentrating compartment side surface with which the first ion exchange material domain is contiguous, is the cation permeable membrane, the first ion exchange material domain is a cation exchange material predominant domain, and wherein the cation exchange material predominant domain is contiguous with at least a portion of the ion-concentrating compartment side surface of the cation permeable membrane, and wherein the at least a portion of the ion-concentrating compartment side surface of the cation permeable membrane defines a second operative side surface fraction of the ion-concentrating compartment side surface of the cation permeable membrane, and wherein the second operative side surface fraction of the ion-concentrating compartment side surface of the cation permeable membrane defines a second operative side surface area fraction of the ion-concentrating compartment side surface of the cation permeable membrane which is at least 10% of the ion-concentrating compartment side surface area of the cation permeable membrane, and wherein the second operative side surface fraction of the ion-concentrating compartment side surface of the cation permeable membrane, in comparison to substantially any remaining fractions of the ion-concentrating compartment side surface of the cation permeable membrane, is closest to an outlet of an ion-depleting compartment disposed on an opposite side of the cation permeable membrane, and wherein the cation exchange material predominant domain is spaced apart from at least a portion of the ion-concentrating compartment side surface of the anion permeable membrane, and wherein the at least a portion of the ion-concentrating compartment side surface of the anion permeable membrane defines a second operative side surface fraction of the ion-concentrating compartment side surface of the anion permeable membrane, and wherein the second operative side surface fraction of the ion-concentrating compartment side surface of the anion permeable membrane defines a second operative side surface area fraction of the ion-concentrating compartment side surface of the anion permeable membrane which is at least 10% of the ion-concentrating compartment side surface area of the anion permeable membrane, and wherein the second operative side surface fraction of the ion-concentrating compartment side surface of the anion permeable membrane, in comparison to substantially any remaining fractions of the ion-concentrating compartment side surface of the anion permeable membrane, is closest to an outlet of an ion-depleting compartment disposed on an opposite side of the anion permeable membrane.

2. The electrodeionization apparatus as claimed in claim 1, further comprising a mixed ion exchange material domain disposed within the ion-concentrating compartment, wherein the disposition of the first ion exchange material domain relative to the other one of the one of the anion permeable membrane and the cation permeable membrane defines a respective space between the first ion exchange material domain and the other one of the one of the anion permeable membrane and the cation permeable membrane, and wherein at least a portion of the mixed ion exchange material domain is disposed within the respective space.

3. The electrodeionization apparatus as claimed in claim 2, wherein the mixed ion exchange material domain is contiguous with the first ion exchange material domain.

4. The electrodeionization apparatus as claimed in claim 1, wherein the one of the anion permeable membrane and the cation permeable membrane, having the at least a portion of the ion-concentrating compartment side surface with which the first ion exchange material domain is contiguous, is the anion permeable membrane;

such that the first ion exchange material domain is an anion exchange material predominant domain, and wherein the anion exchange material predominant domain is contiguous with at least a portion of the ion-concentrating compartment side surface of the anion permeable membrane, and wherein the at least a portion of the ion-concentrating compartment side surface of the anion permeable membrane defines a first operative side surface fraction of the ion-concentrating compartment side surface of the anion permeable membrane, and wherein the first operative side surface fraction of the ion-concentrating compartment side surface of the anion permeable membrane defines a first operative side surface area fraction of the ion-concentrating compartment side surface of the anion permeable membrane which is at least 10% of the ion-concentrating compartment side surface area of the anion permeable membrane, and wherein the first operative side surface fraction of the ion-concentrating compartment side surface of the anion permeable membrane, in comparison to substantially any remaining fractions of the ion-concentrating compartment side surface of the anion permeable membrane, is closest to an outlet of an ion-depleting compartment disposed on an opposite side of the anion permeable membrane, and wherein the anion exchange material predominant domain is spaced apart from at least a portion of the ion-concentrating compartment side surface of the cation permeable membrane, and wherein the at least a portion of the ion-concentrating compartment side surface of the cation permeable membrane defines a first operative side surface fraction of the ion-concentrating compartment side surface of the cation permeable membrane, and wherein the first operative side surface fraction of the ion-concentrating compartment side surface of the cation permeable membrane defines a first operative side surface area fraction of the ion-concentrating compartment side surface of the cation permeable membrane which is at least 10% of the ion-concentrating compartment side surface area of the cation permeable membrane, and wherein the first operative side surface fraction of the ion-concentrating compartment side surface of the cation permeable membrane, in comparison to substantially any remaining fractions of the ion-concentrating compartment side surface of the cation permeable membrane, is closest to an outlet of an ion-depleting compartment disposed on an opposite side of the cation permeable membrane.

5. The electrodeionization apparatus as claimed in claim 4, further comprising a mixed ion exchange material domain disposed within the ion-concentrating compartment, wherein the disposition of the anion exchange material predominant domain relative to the cation permeable membrane defines a respective space between the anion exchange material predominant domain and the cation permeable membrane, and wherein at least a portion of the mixed ion exchange material domain is disposed within the respective space.

6. The electrodeionization apparatus as claimed in claim 4, further comprising a non-anion exchange material predominant domain contiguous with at least a portion of the ion-concentrating compartment side surface of the cation permeable membrane.

7. The electrodeionization apparatus as claimed in claim 6, wherein the at least a portion of the ion-concentrating compartment side surface of the cation permeable membrane defines a second operative side surface fraction of the ion-concentrating compartment side surface of the cation permeable membrane, and wherein the second operative side surface fraction of the ion-concentrating compartment side surface of the cation permeable membrane defines a second operative side surface area fraction of the ion-concentrating compartment side surface of the cation permeable membrane which is at least 10% of the ion-concentrating compartment side surface area of the cation permeable membrane, and wherein the second operative side surface fraction of the ion-concentrating compartment side surface of the cation permeable membrane, in comparison to substantially any remaining fractions of the ion-concentrating compartment side surface of the cation permeable membrane, is closest to an outlet of an ion-depleting compartment disposed on an opposite side of the cation permeable membrane.

8. The electrodeionization apparatus as claimed in claim 7, further comprising a mixed ion exchange material domain disposed within the ion-concentrating compartment, wherein the disposition of the anion exchange material predominant domain relative to the cation permeable membrane defines a respective first space between the anion exchange material predominant domain and the cation permeable membrane, and wherein the disposition of the non-anion exchange material predominant domain relative to the anion permeable membrane defines a respective second space between the cation exchange material predominant domain and the anion permeable membrane, and wherein at least a portion of the mixed ion exchange material domain is disposed within at least one of the respective first and second spaces.

9. The electrodeionization apparatus as claimed in claim 1, wherein the one of the anion permeable membrane and the cation permeable membrane, having the at least a portion of the ion-concentrating compartment side surface with which the first ion exchange material domain is contiguous, is the cation permeable membrane, the first ion exchange material domain is a cation exchange material predominant domain, and wherein the cation exchange material predominant domain is contiguous with at least a portion of the ion-concentrating compartment side surface of the cation permeable membrane, and wherein the at least a portion of the ion-concentrating compartment side surface of the cation permeable membrane defines a second operative side surface fraction of the ion-concentrating compartment side surface of the cation permeable membrane, and wherein the second operative side surface fraction of the ion-concentrating compartment side surface of the cation permeable membrane defines a second operative side surface area fraction of the ion-concentrating compartment side surface of the cation permeable membrane which is at least 10% of the ion-concentrating compartment side surface area of the cation permeable membrane, and wherein the second operative side surface fraction of the ion-concentrating compartment side surface of the cation permeable membrane, in comparison to substantially any remaining fractions of the ion-concentrating compartment side surface of the cation permeable membrane, is closest to an outlet of an ion-depleting compartment disposed on an opposite side of the cation permeable membrane, and wherein the cation exchange material predominant domain is spaced apart from at least a portion of the ion-concentrating compartment side surface of the anion permeable membrane, and wherein the at least a portion of the ion-concentrating compartment side surface of the anion permeable membrane defines a second operative side surface fraction of the ion-concentrating compartment side surface of the anion permeable membrane, and wherein the second operative side surface fraction of the ion-concentrating compartment side surface of the anion permeable membrane defines a second operative side surface area fraction of the ion-concentrating compartment side surface of the anion permeable membrane which is at least 10% of the ion-concentrating compartment side surface area of the anion permeable membrane, and wherein the second operative side surface fraction of the ion-concentrating compartment side surface of the anion permeable membrane, in comparison to substantially any remaining fractions of the ion-concentrating compartment side surface of the anion permeable membrane, is closest to an outlet of an ion-depleting compartment disposed on an opposite side of the anion permeable membrane.

10. The electrodeionization apparatus as claimed in claim 9, further comprising a mixed ion exchange material domain disposed within the ion-concentrating compartment, wherein the disposition of the cation exchange material predominant domain relative to the anion permeable membrane defines a respective space between the cation exchange material predominant domain and the anion permeable membrane, and wherein at least a portion of the mixed ion exchange material domain is disposed within the respective space.

11. The electrodeionization apparatus as claimed in claim 9, further comprising a non-cation exchange material predominant domain contiguous with at least a portion of the ion-concentrating compartment side surface of the anion permeable membrane.

12. The electrodeionization apparatus as claimed in claim 11, further comprising a mixed ion exchange material domain disposed within the ion-concentrating compartment, wherein the disposition of the cation exchange material predominant domain relative to the anion permeable membrane defines a respective first space between the cation exchange material predominant domain and the anion permeable membrane, and wherein the disposition of the non-cation exchange material predominant domain relative to the cation permeable membrane defines a respective second space between the non-cation exchange material predominant domain and the cation permeable membrane, and wherein at least a portion of the mixed ion exchange material domain is disposed within at least one of the respective first and second spaces.

* * * * *